(12) United States Patent
Wang et al.

(10) Patent No.: US 12,429,558 B2
(45) Date of Patent: Sep. 30, 2025

(54) POSITIONING OF PASSIVE INTERNET OF THINGS (IOT) DEVICES

(71) Applicant: QUALCOMM Incorporated, San Diego, CA (US)

(72) Inventors: Xiaojie Wang, Hillsborough, NJ (US); Jing Sun, San Diego, CA (US); Junyi Li, Fairless Hills, PA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 18/053,361

(22) Filed: Nov. 7, 2022

(65) Prior Publication Data
US 2024/0151815 A1 May 9, 2024

(51) Int. Cl.
*G01S 7/41* (2006.01)
*G01S 5/02* (2010.01)
*G01S 7/4865* (2020.01)
*H04W 64/00* (2009.01)

(52) U.S. Cl.
CPC ............ *G01S 7/414* (2013.01); *G01S 5/0284* (2013.01); *G01S 7/4865* (2013.01); *H04W 64/003* (2013.01)

(58) Field of Classification Search
CPC ...... G01S 7/414; G01S 5/0284; G01S 7/4865; H04W 64/003
See application file for complete search history.

(56) References Cited

U.S. PATENT DOCUMENTS

| 9,734,367 B1 | 8/2017 | Lecky et al. |
| 2005/0206555 A1* | 9/2005 | Bridgelall ............... G01S 13/46 340/8.1 |
| 2008/0042844 A1 | 2/2008 | Christopher |
| 2019/0178976 A1* | 6/2019 | Xiong ................... H04W 64/00 |

OTHER PUBLICATIONS

Anee R.E.A., et al., "Chipless RFID Tag Localization", IEEE Transactions on Microwave Theory and Techniques, IEEE, USA, vol. 61, No. 11, Nov. 1, 2013, pp. 4008-4017, XP011531381, The Whole Document.
Dardari D., et al., "The Future of Ultra-wideband Localization in RFID", 2016 IEEE International Conference on RFID, IEEE, May 3, 2016, 7 Pages, XP032909975, The Whole Document.
International Search Report and Written Opinion—PCT/US2023/032784—ISA/EPO—Dec. 20, 2023.

* cited by examiner

*Primary Examiner* — Justin Y Lee
(74) *Attorney, Agent, or Firm* — Procopio, Cory, Hargreaves & Savitch LLP/QUALCOMM Incorporated

(57) ABSTRACT

Aspects presented herein may enable an entity that is receiving (or reading) reflected/backscattered signals from an IoT device to differentiate the reflected/backscattered signals from other reflections (e.g., noise or signals bounced from other objects). In one aspect, a wireless device transmits an indication of a positioning session to an IoT device, wherein the indication initiates the positioning session for the IoT device. The wireless device transmits, based on the positioning session, a set of PRSs to the IoT device via a plurality of transmission occasions. The wireless device receives, from the IoT device based on a reflection pattern, at least one PRS in the set of PRSs via at least one reception occasion.

23 Claims, 21 Drawing Sheets

POSITIONING OF PASSIVE INTERNET OF THINGS (IOT) DEVICES

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits an indication of a positioning session to an Internet of Things (IoT) device, where the indication initiates the positioning session for the IoT device. The apparatus transmits, based on the positioning session, a set of positioning reference signals (PRSs) to the IoT device via a plurality of transmission occasions. The apparatus receives, from the IoT device based on a reflection pattern, at least one PRS in the set of PRSs via at least one reception occasion.

In an aspect of the disclosure, a method, a computer-readable medium, and an apparatus are provided. The apparatus receives an indication of a positioning session from a wireless device, where the indication initiates the positioning session for the IoT device. The apparatus receives a set of PRSs from the wireless device via a plurality of reception occasions. The apparatus forwards the set of PRSs based on a reflection pattern via a plurality of transmission occasions, where the reflection pattern is associated with a combination of reflection operations performed during the plurality of transmission occasions, where the reflection operations include at least one of: a total reflection, an absorption, or an open-circuit.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
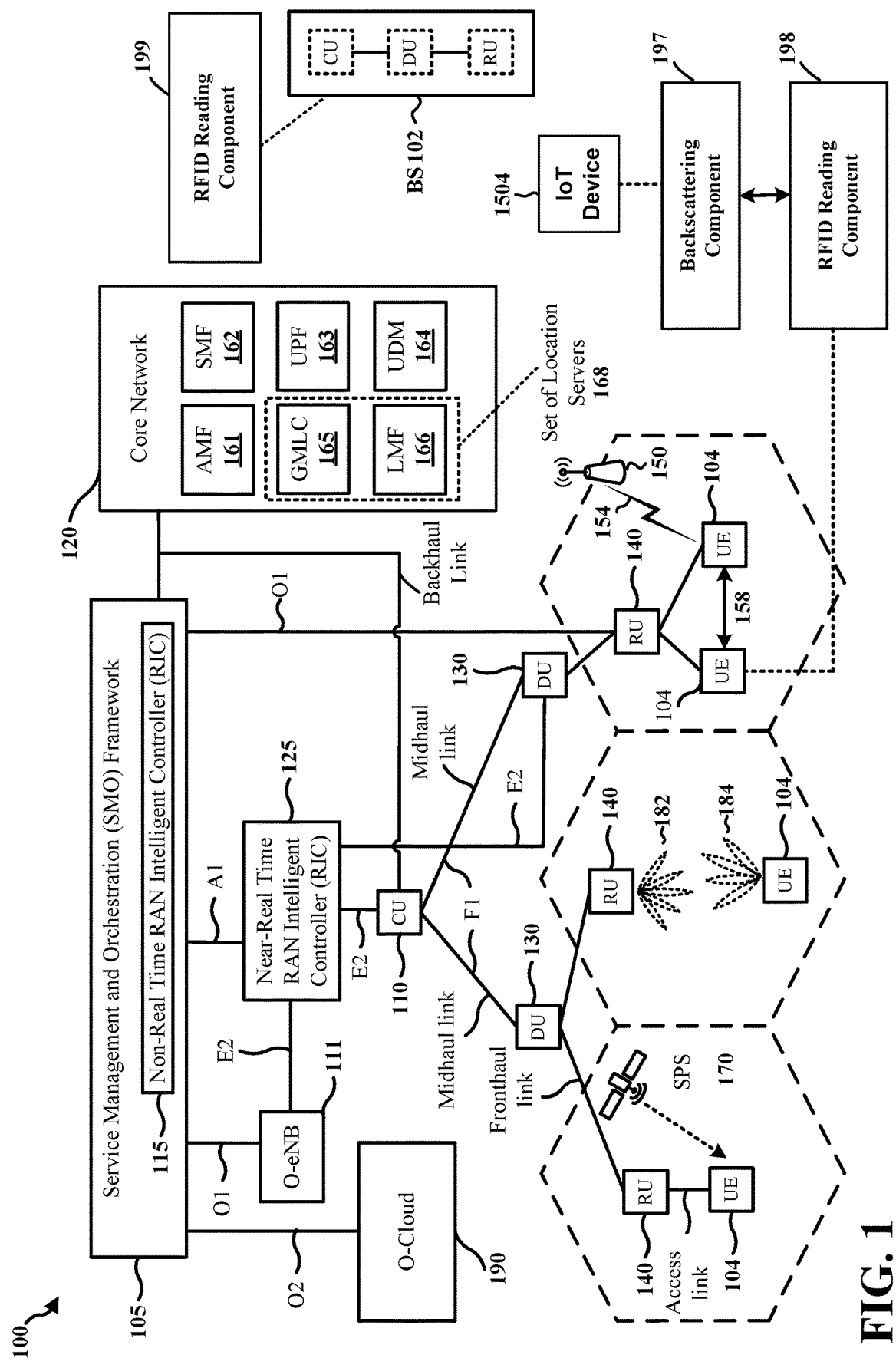
FIG. 1 is a diagram illustrating an example of a wireless communications system and an access network.

Aspects presented herein may enable and improve the positioning of Internet of Things (IoT) devices, and specifically the positioning of passive IoT devices. Aspects presented herein may enable an entity that is receiving (or reading) reflected/backscattered signals from an IoT device to differentiate the reflected/backscattered signals from other reflections (e.g., noise or signals bounced from other objects). As such, aspects presented herein may enable a more accurate and efficient positioning of an IoT device, which may have a low-power positioning constraint and/or an energy constraint.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to transmit an indication of a positioning session to an IoT device, where the indication initiates the positioning session for the IoT device; transmit, based on the positioning session, a set of PRSs to the IoT device via a plurality of transmission occasions; and receive, from the IoT device based on a reflection pattern, at least one PRS in the set of PRSs via at least one reception occasion (e.g., via the RFID reading component 198).

In certain aspects, the base station 102 may be configured to transmit an indication of a positioning session to an IoT device, where the indication initiates the positioning session for the IoT device; transmit, based on the positioning session, a set of PRSs to the IoT device via a plurality of transmission occasions; and receive, from the IoT device based on a reflection pattern, at least one PRS in the set of PRSs via at least one reception occasion (e.g., via the RFID reading component 199).

In certain aspects, the RFID tag 1504 (e.g., an IoT device) may be configured to receive an indication of a positioning session from a wireless device, where the indication initiates the positioning session for the IoT device; receive a set of PRSs from the wireless device via a plurality of reception occasions; and forward the set of PRSs based on a reflection pattern via a plurality of transmission occasions, where the reflection pattern is associated with a combination of reflection operations performed during the plurality of transmission occasions, where the reflection operations include at least one of: a total reflection, an absorption, or an open-circuit (e.g., via the backscattering component 197).

Figure 2:
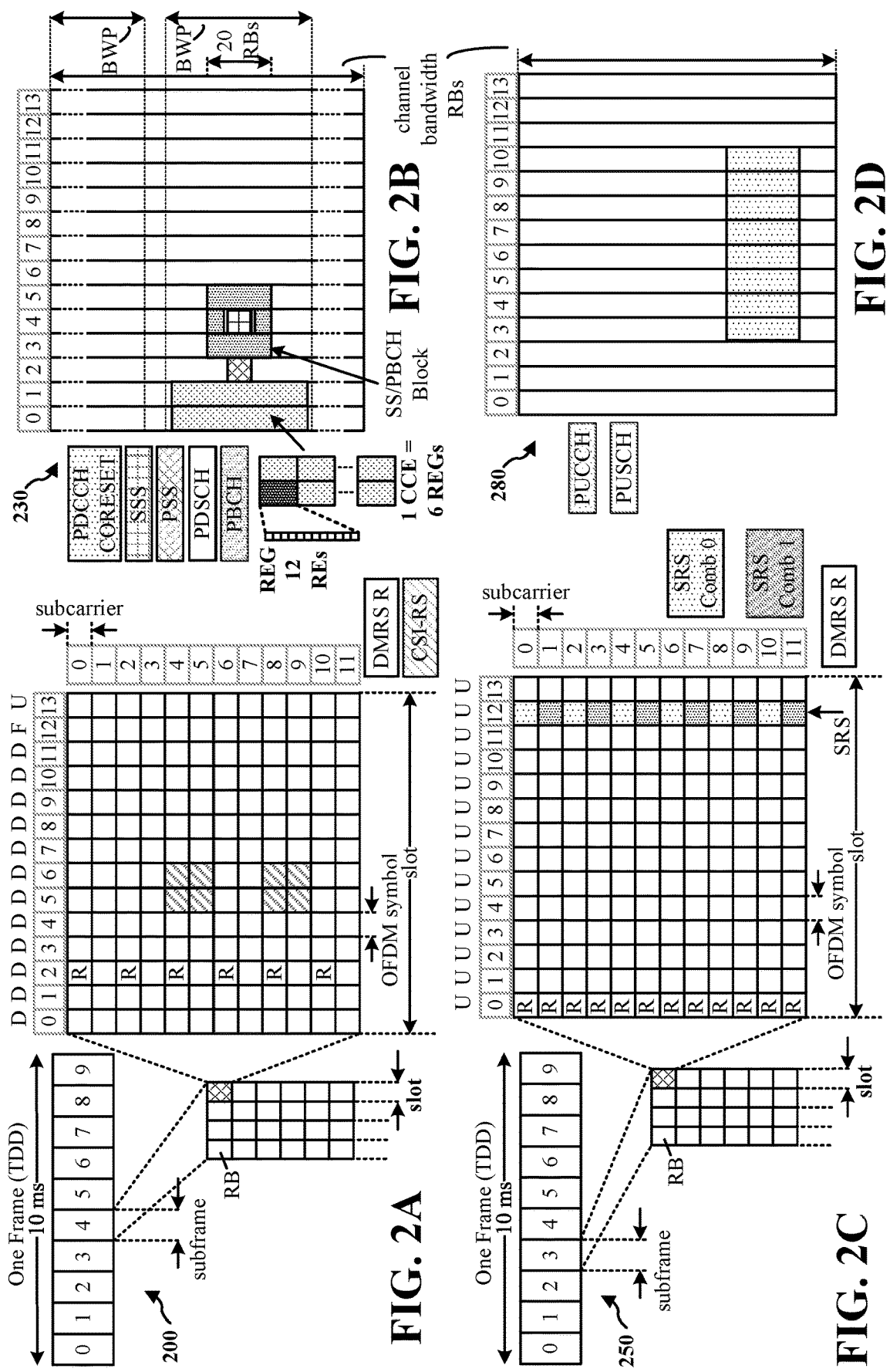
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15[KHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu} \cdot 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
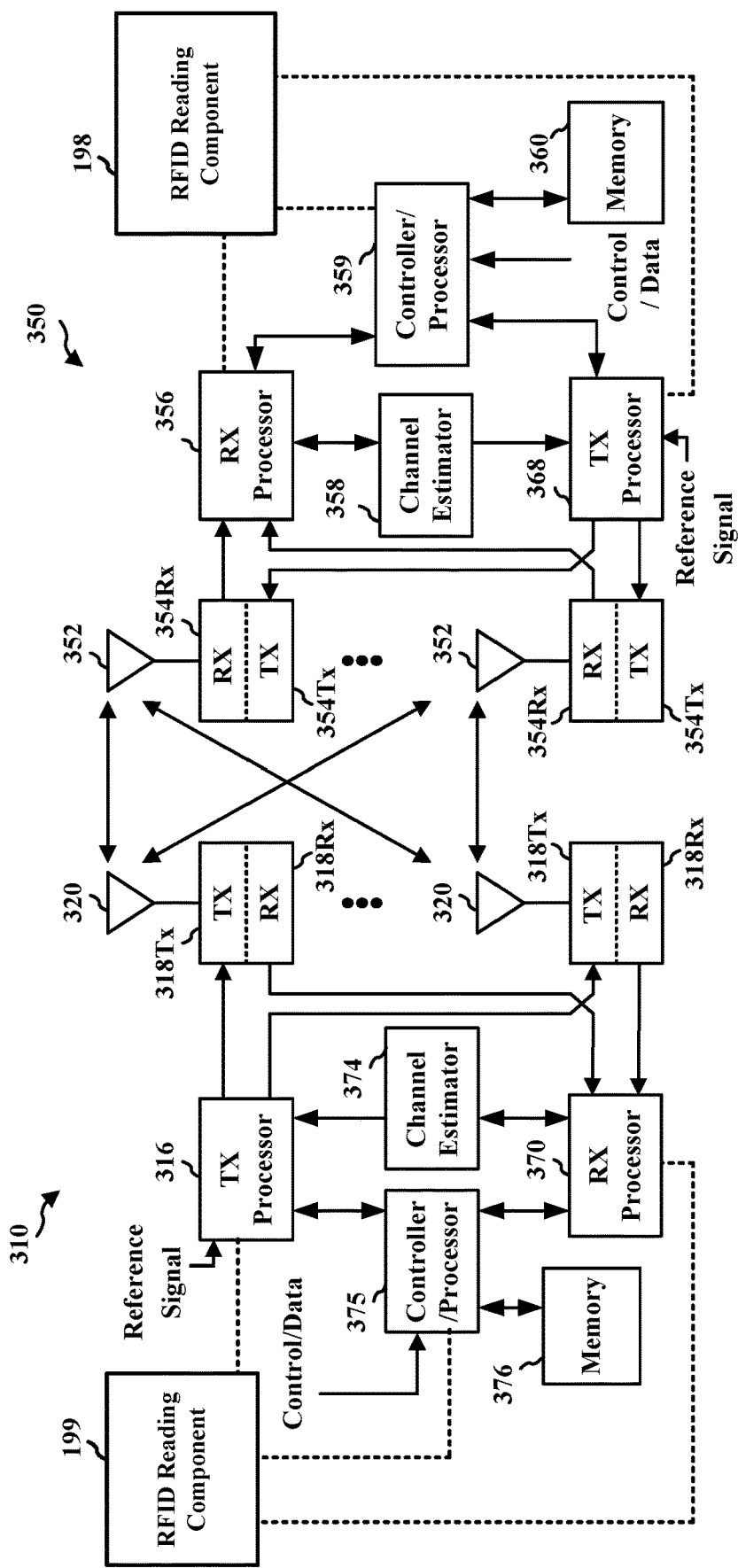
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the RFID reading component 198 of FIG. 1.

At least one of the TX processor 316, the RX processor 370, and the controller/processor 375 may be configured to perform aspects in connection with the RFID reading component 199 of FIG. 1.

Figure 4:
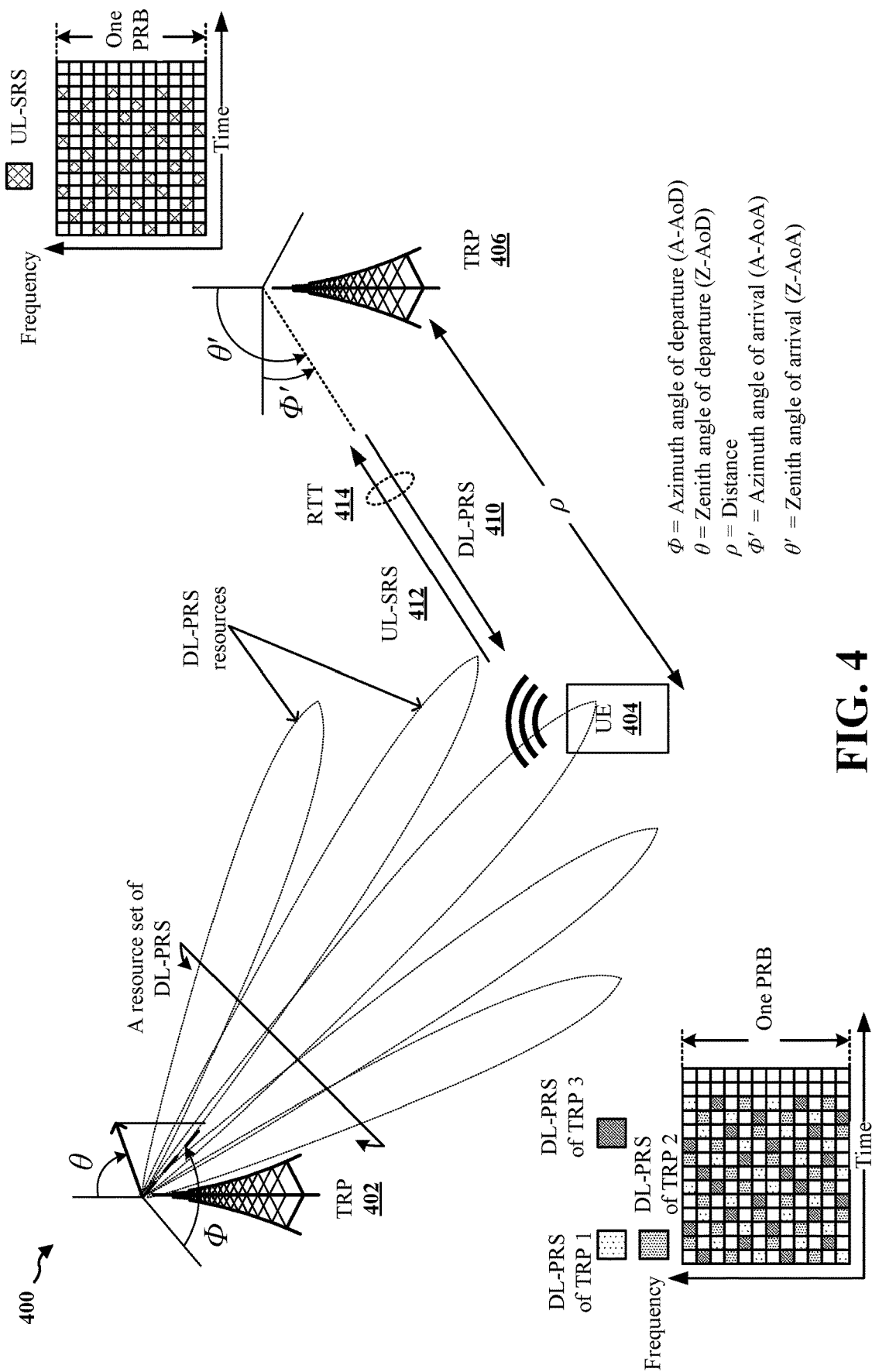
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s)168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some scenarios, the positioning of an object may be performed using an Internet of Things (IoT) device, such as by attaching an IoT device on the object and measuring signals backscattered/reflected from the IoT device. For example, one or more wireless devices (e.g., a UE, a base station, a component of a base station, a transmission reception point (TRP), or a combination thereof) may transmit signals to an IoT device (e.g., a device to be tracked or is attached to an object to be tracked), and the one or more wireless devices may receive signals reflected/backscattered (which may be referred to as "backscattered signal(s)" hereafter) from the IoT device and measure the received backscattered signal(s). For example, the one or more wireless devices may measure the round-trip time (RTT), the time of arrival (ToA), the angle of arrival (AoA), and other positioning related measurements described in connection with FIG. 4, etc., of the backscattered signal(s) (which may collectively be referred to as "positioning measurements" hereafter). Based on the positioning measurements for the backscattered signals, the position and/or the relative position of the IoT device may be calculated, estimated, and/or determined. A relative position of an IoT device may refer to the position of the IoT device with respect to another device or entity, such as a UE or a base station. For example, the relative position of an IoT device may be 10 meters from a base station, east of the base station, etc. For purposes of the present disclosure, an IoT device may refer to a device that is capable of wirelessly connecting to a network and have the ability to transmit data. For example, an IoT device may be a piece of hardware, such as a sensor, an actuator, a gadget, an appliance, or a machine, that is programmed for a certain application and is capable of transmitting data over the Internet or other networks.

In some examples, an IoT device may be referred to as a radio frequency identification (RFID), an RFID tag (or simply a tag), an RFID device, a passive RFID, a backscatter-based RFID, or a backscatter-based IoT, etc. (collectively as "RFID tag" or "passive IoT device" hereafter). RFID may refer to a form of wireless communication that incorporates the use of electromagnetic or electrostatic coupling in the radio frequency portion of the electromagnetic spectrum to uniquely identify an object, an animal or a person, etc. A device that is capable of reading information transmitted from an IoT device may be referred to as a backscatter receiver, a backscatter reader, an RFID reader, an RFID reader UE, and/or a reader UE, etc. (collectively as "RFID reader" hereafter). In addition, the wireless device that transmits signals to the IoT devices (which may be a different entity than the RFID reader) may be referred to as an RF source, an RF source UE, or a carrier emitter. Note that a wireless device/entity may be capable of both transmitting signals to an IoT device and receiving reflected signals (e.g., readings) from the IoT device, which may be referred to as full-duplex devices. As such, an RF source may also be an RFID reader and vice versa.

RFID is a rapidly growing technology impacting many industries due to its economic potential for inventory/asset management (e.g., asset tracking, asset monitoring, etc.) in both indoor and outdoor environments, such as inside or outside of a warehouse, for IoT, for sustainable sensor networks in factories and/or agriculture, and for smart homes, etc.

Figure 5:
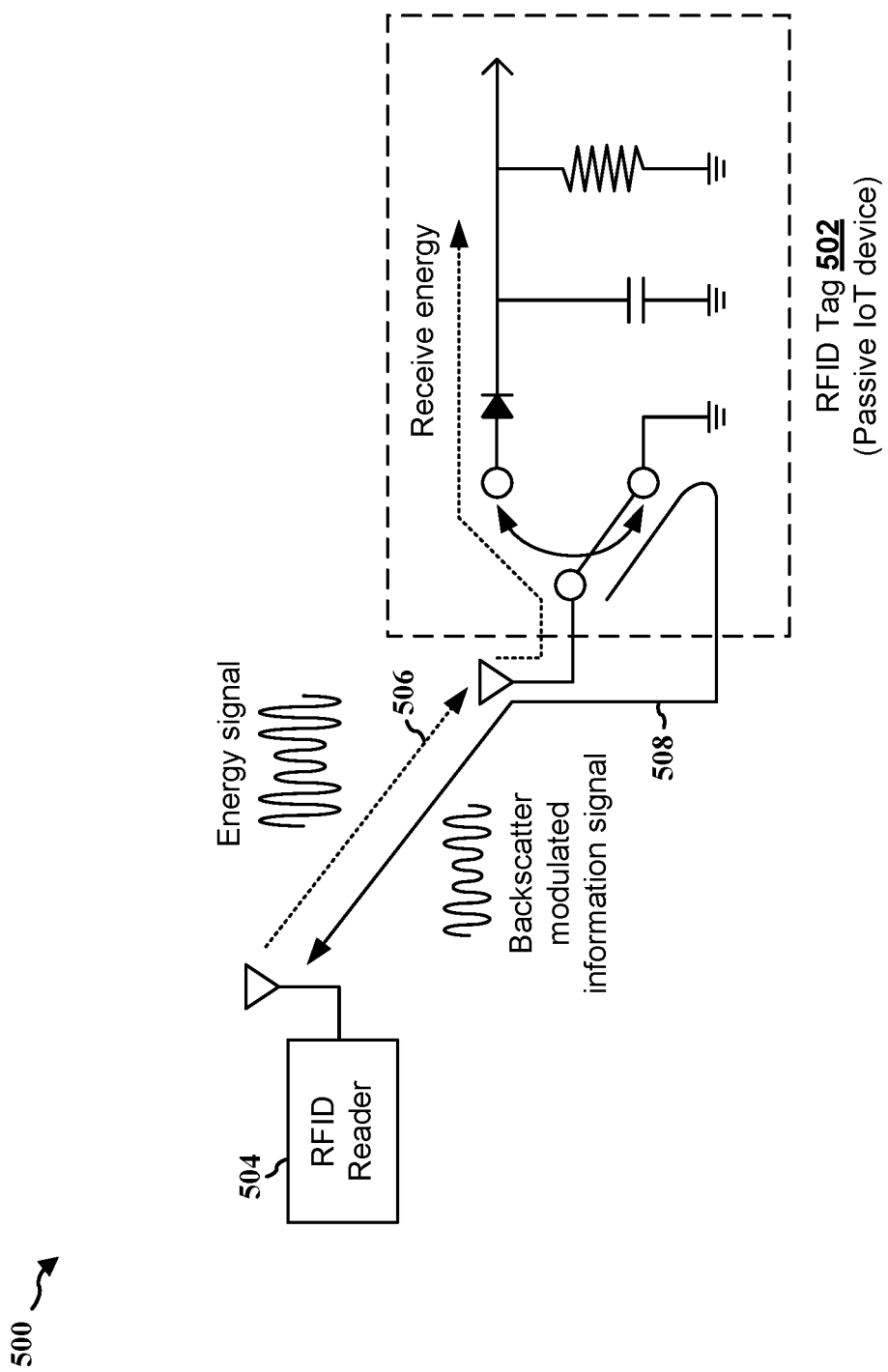
FIG. 5 is a diagram illustrating an example radio frequency identification (RFID) tag in accordance with various aspects of the present disclosure.

FIG. 5 is a diagram 500 illustrating an example RFID tag in accordance with various aspects of the present disclosure. An RFID tag 502 (e.g., a passive IoT device) may include small transponder(s) emitting an information-bearing signal upon receiving a signal (e.g., from an RFID reader 504). The RFID tag 502 may operate without a battery at a low operating expense (OPEX), at a low maintenance cost, and/or with a long-life circle. As shown at 506, the RFID tag 502 may absorb/harvest energy over the air based on the energy signals transmitted from the RFID reader 504 to power its transmission/reception circuitry. Then, as shown at 508, the RFID tag 502 may use the absorbed/harvested energy to transmit (e.g., reflect/backscatter) an information signal (e.g., a signal that contains information, a 1-bit indication, a multi-bit indication, etc.), where the transmitted information signal may be typically backscatter modulated (e.g., modulated based on the signals received form the RFID reader 504). There may also be RFID tags with batteries (which may be referred as semi-passive or active RFID tags), which typically have higher cost compared to RFID tags without batteries.

Figure 6:
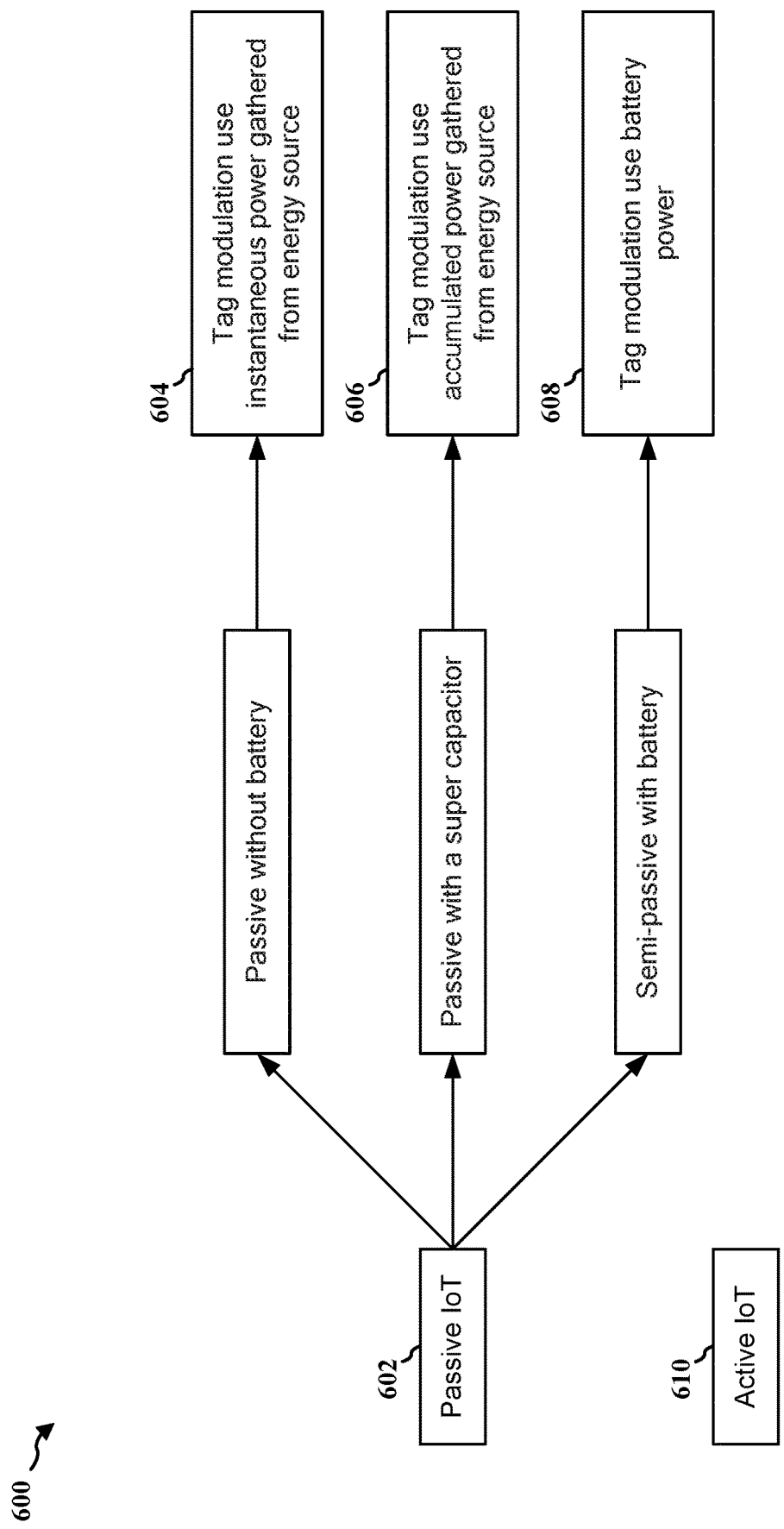
FIG. 6 is a diagram illustrating examples of different types of Internet of Things (IoT) devices in accordance with various aspects of the present disclosure.

FIG. 6 is a diagram 600 illustrating examples of different types of IoT devices (e.g., RFID tags) in accordance with various aspects of the present disclosure. An IoT device may be configured to be a passive IoT device or an active IoT device. For example, as shown at 604, a passive IoT device 602 may not have a battery in its terminal, but its terminal may accumulate (e.g., absorb or harvest) energy from radio signaling (e.g., transmitted from a base station, an RF source, a wireless device, a UE, etc.). In another example, as shown at 606, the passive IoT device 602 may include a super capacitor, where the terminal of the passive IoT device 602 may accumulate energy from other source(s) of energy, such as solar, wind, thermoelectric, etc., as supplement. In another example, as shown at 608, the passive IoT device 602 may be configured to be semi-passive with a battery, which may enable the passive IoT device 602 to modulate/transmit signals using the power from the battery, and the passive IoT device 602 may be able to activate almost all the time but may not transmit actively. For a passive IoT device, a user may connect to it and receive information from it. On the other hand, an active IoT device 610 may transmit information as a timed, a threshold, and/or a constant stream (e.g., may be performed without first receiving a signal from an RF source). For example, an active IoT device or a semi-active IoT device may include an amplification capability and/or active RF components, which may enable the IoT device to transmit better quality transmission/information.

Figure 7:
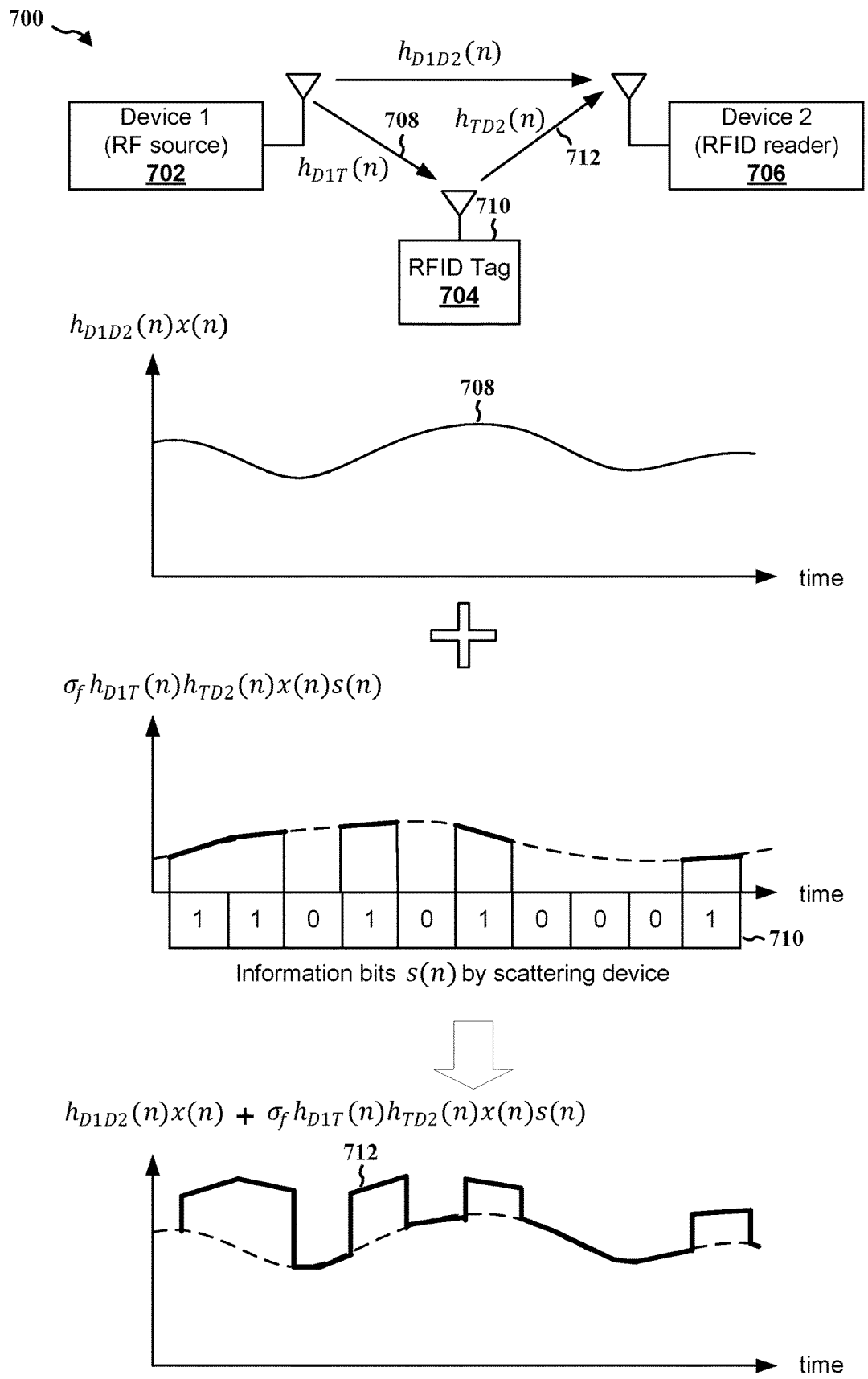
FIG. 7 is a diagram illustrating an example of a passive IoT device performing backscattering/reflection of signal with modulation in accordance with various aspects of the present disclosure.

FIG. 7 is a diagram 700 illustrating an example of a passive IoT device (e.g., an RFID tag) performing backscattering/reflection of signal with modulation in accordance with various aspects of the present disclosure. In one example, one of the major information modulation methods used by a passive IoT device (e.g., an RFID tag 704) may be amplitude shift keying (ASK), where the passive IoT device may be configured to switch on the reflection when transmitting information bit '1' and switch off the reflection when transmitting information bit '0'.

For example, as shown at 708, a first device 702 (e.g., an RF source, a first UE or a network entity that is capable of transmitting RF waves) may transmit a certain radio wave denoted as x(n), which is to be received by an RFID tag 704 (e.g., a passive IoT device, an RFID reader, etc.). As shown at 710, the information bits of the RFID tag 704 may be denoted as s(n)∈{0,1}. Then, as shown at 712, the received signal y(n) at a second device (e.g., a second UE, an RF reader, etc.) may be denoted by $y(n)=(h_{D1D2}(n)+\sigma_f h_{D1T}(n) h_{TD2}(n)s(n))\times(n)+noise$. Note the first device 702 and the second device 706 may also be the same device, which may be referred to as a full-duplex device). In one example, when s(n)=0, the RFID tag 704 may be configured to switch off the reflection (e.g., the RFID tag 704 does not transmit any signal), such that the second device 706 may just receive a direct link signal from the first device 702 (e.g., $y(n)=h_{D1D2}(n)\times(n)+noise$). However, when s(n)=1, the RFID tag 704 may be configured to switch on the reflection, such that the second device 706 may receive a superposition of both the direct link signal and the backscatter link signal (e.g., $y(n)=(h_{D1D2}(n)+\sigma_f h_{D1T}(n) h_{TD2}(n)s(n))\times(n)+noise$, such as shown at 712, where $\sigma_f$ may denote the reflection coefficient).

Figure 8:
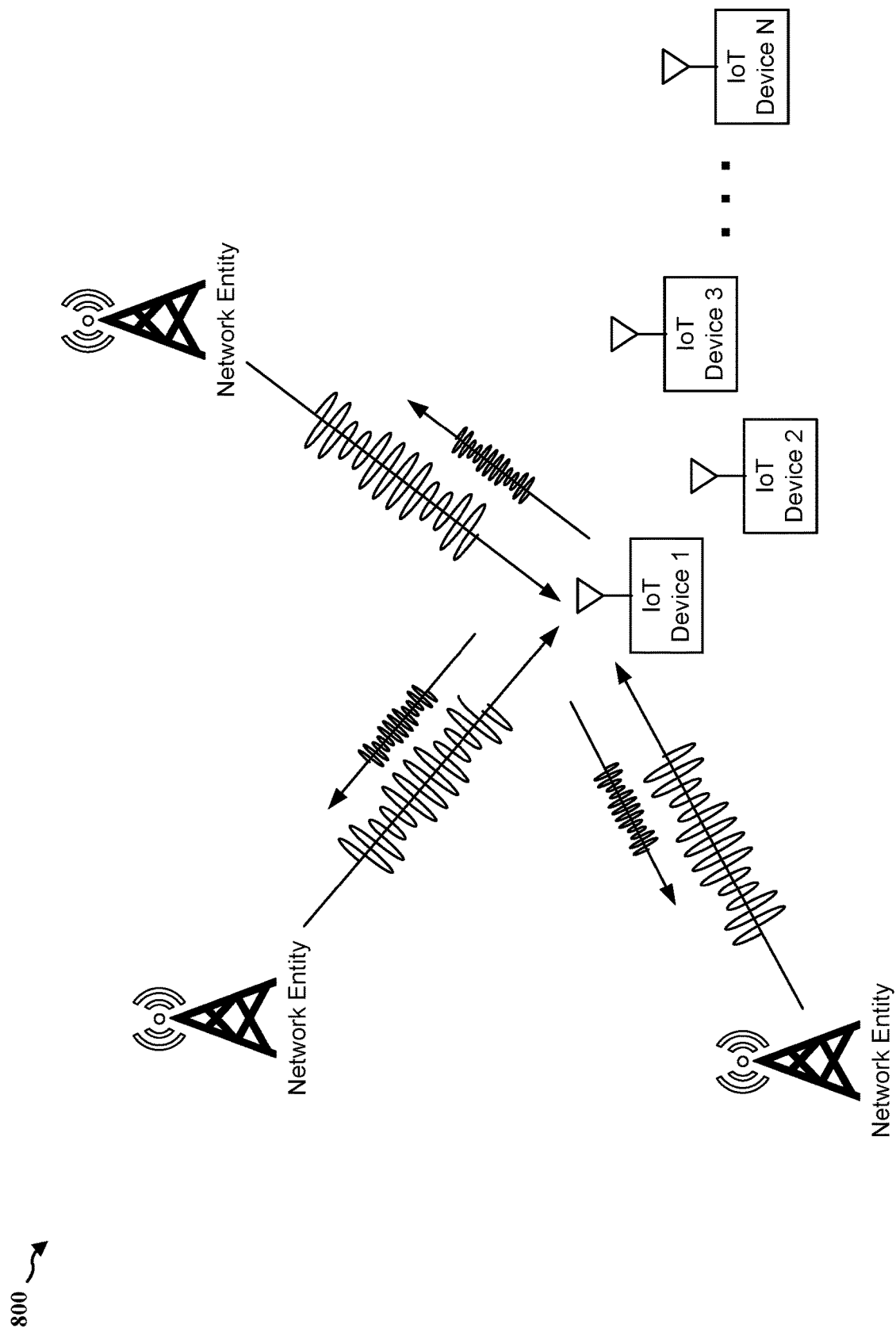
FIG. 8 is a diagram illustrating an example of a network entity communicating with a set of IoT devices in accordance with various aspects of the present disclosure.

FIG. 8 is a diagram 800 illustrating an example of a network entity communicating with (e.g., receiving information from) a set of IoT devices in accordance with various aspects of the present disclosure. In some examples, the network entity may be a relay node, a RAN node, a non-RAN node, an IAB node, a base station, a component of a base station, etc. As wireless communication (e.g., 5G NR) has been expanding to support different types of wireless devices, such as enhanced mobile broadband (eMBB) devices, ultra-reliable low latency communications (URLLC) devices, and/or machine type communications (MTC) devices, etc., it is likely that the wireless communication may also be expanded to support IoT devices such as passive IoT devices. While a network may not yet be able to efficiently support certain pervasive RFID-type of sensors (e.g., passive IoT devices) in certain scenarios, e.g., asset management, logistics, warehousing and manufacturing, etc. A next generation network may be specified to support or manage passive IoT devices, where a network entity (e.g., a base station, a component of a base station, an IAB node, etc.) may be configured/specified to provide energy to the passive IoT devices and/or read/write information stored on passive IoT devices. For example, the passive IoT devices may reflect/backscatter information-bearing signals to the network entity, and the network entity may read the reflected/backscattered signal by passive IoT devices to decode the information transmitted by the passive IoT devices. In another example, multiple network entities may transmit signals to an IoT device (e.g., the IoT device 1) and receive the signal backscattered/reflected from the IoT device. Based on the RTT or ToA of the backscattered signal, each of the multiple network entities may calculate/estimate a distance/angle between that network entity and the IoT device. As such, the position of the IoT device may be determined (e.g., based on trilateration/triangulation mechanisms).

Figure 9:
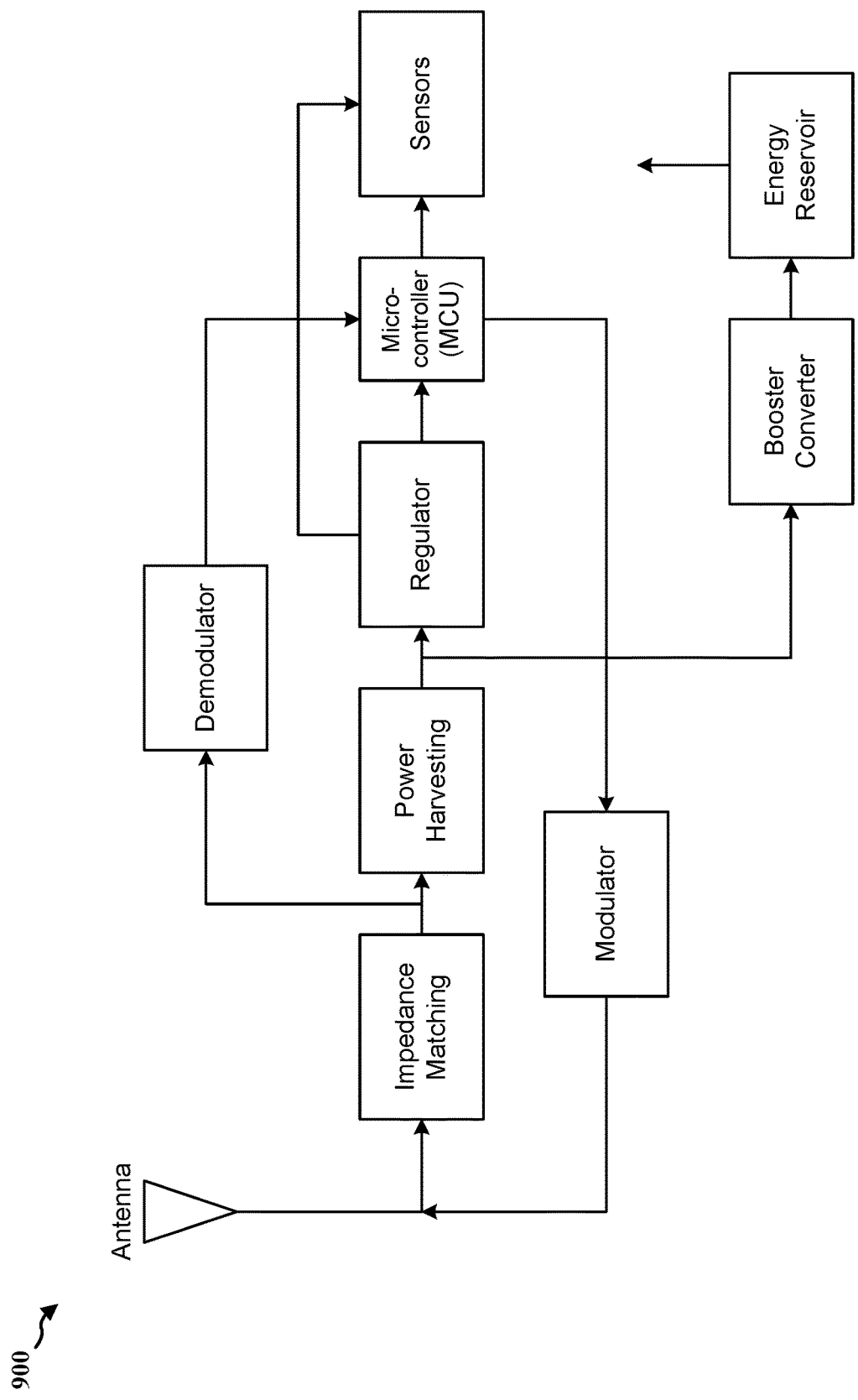
FIG. 9 is a diagram illustrating an example energy transfer associated with a passive IoT device in accordance with various aspects of the present disclosure.

FIG. 9 is a diagram 900 illustrating an example energy transfer associated with a passive IoT device in accordance with various aspects of the present disclosure. A passive IoT device may include a power harvesting (PH) circuitry that is configured to absorb/harvest power from an RF signal. The input power at the PH circuitry may be non-linear (e.g., due to diodes). In some examples, a suitable input power at the PH circuitry is larger than −20 dBm (−10 dBm may be specified) to "turn-on" the PH circuitry (e.g., due to turn-on voltage of diodes). In other examples, the passive IoT device may operate more efficiently at lower frequencies due to diode junction capacitance and resistance (e.g., frequency-selective conversion efficiency).

Figure 10:
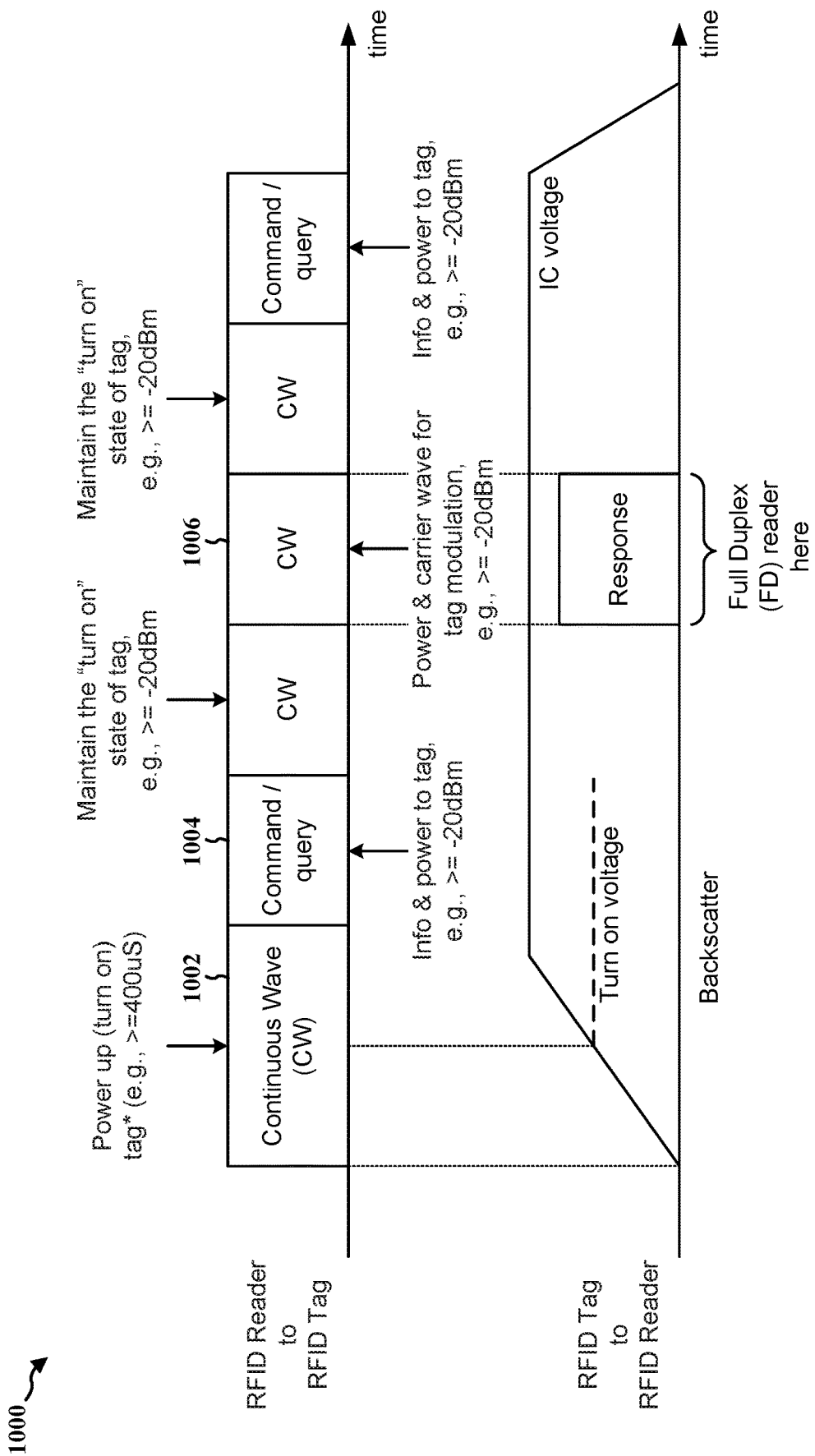
FIG. 10 is a diagram illustrating an example communication procedure between an RFID reader and an RFID tag in accordance with various aspects of the present disclosure.

FIG. 10 is a diagram 1000 illustrating an example communication procedure between an RFID reader and an RFID tag in accordance with various aspects of the present disclosure. As shown at 1002, an RFID reader (which may be a network entity or a UE that is capable of providing RF source and read RFID) may transmit signals (e.g., continuous waves (CWs)) to an RFID tag, and the RFID tag may absorb/harvest power from the signals, such as described in connection with FIG. 5. In some scenarios, the RFID tag may have a turn-on voltage, where it may take a period of time for the RFID tag to absorb the power and to have sufficient power to transmit information (e.g., a modulated signal) or communicate with the RFID reader.

As shown at 1004, after the RFID tag absorbs sufficient power and is turned on, the RFID reader may transmit a command or a query to the RFID tag (or the RFID tag may become able to receive the commend/query from the RFID reader). The RFID tag may continue to absorb power from the signals (e.g., from the CWs) transmitted by the RFID reader. Then, as shown at 1006, in response to the command/query, the RFID tag may transmit information requested by the RFID reader (e.g., via a multi-bit indication) to the RFID reader, such as described in connection with FIG. 7. This process may continue and repeat until the RFID tag stops receiving signals from the RFID reader (e.g., the RFID tag is no longer able to absorb power).

Figure 11:
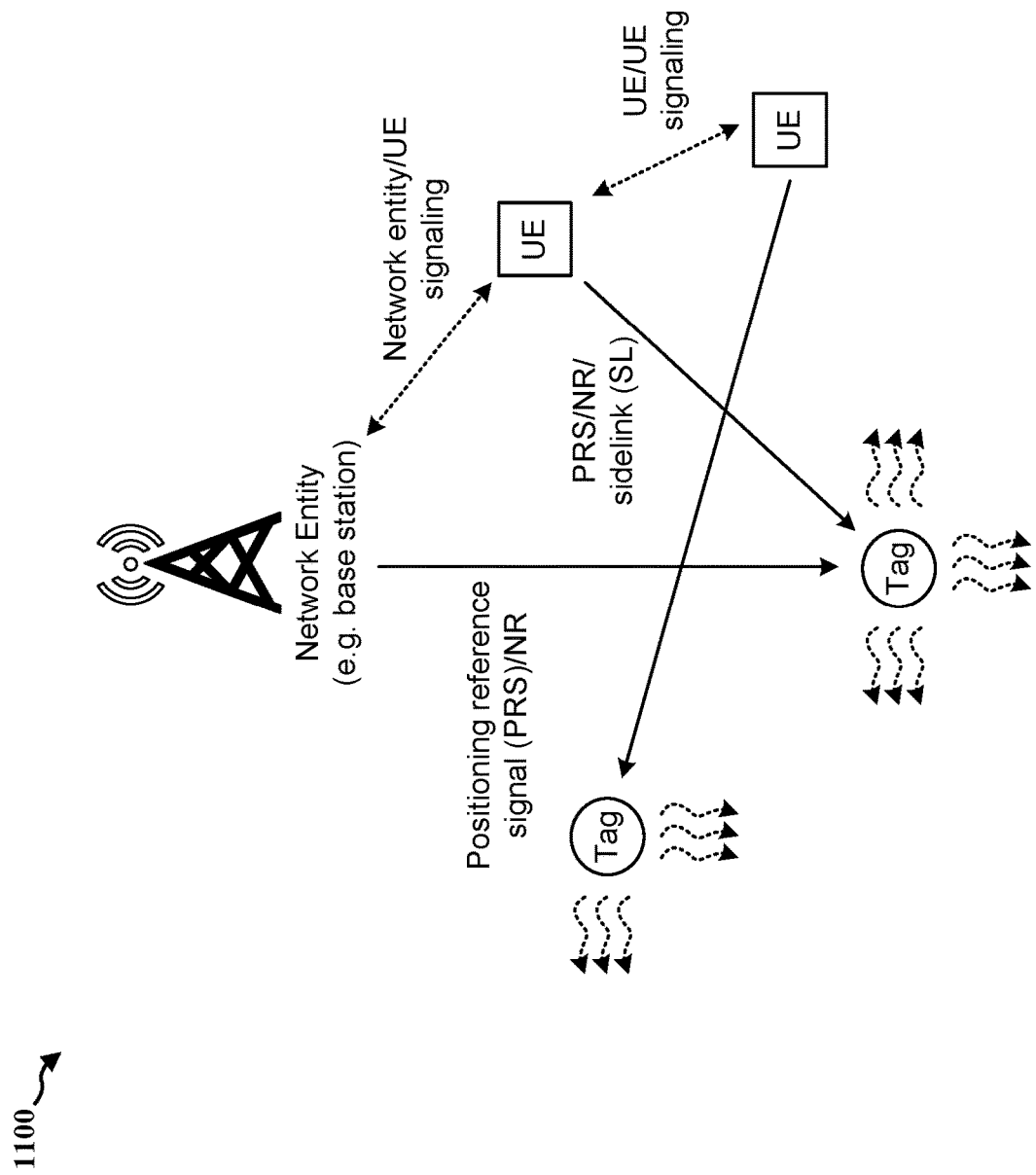
FIG. 11 is a diagram illustrating an example positioning for IoT devices in accordance with various aspects of the present disclosure.

FIG. 11 is a diagram 1100 illustrating an example positioning for IoT devices in accordance with various aspects of the present disclosure. As described in connection with FIGS. 4, 5, and 8, the position or the relative position of an IoT device may be based on measuring backscattered signals transmitted from the IoT device at multiple network entities (e.g., base station(s), UE(s), etc.). For example, a network entity (e.g., a base station, a component of a base station) may transmit positioning reference signals (PRSs) to an IoT device and measure the PRSs backscattered/reflected from the IoT device. Similarly, a UE may transmit PRSs or sidelink (SL) signals to the IoT device and measure the PRSs/SL signals backscattered/reflected from the IoT device. Base on the measurements, the position of the IoT device may be determined.

The positioning of a moving or stationary object using a radar may be based on measuring reflection from the moving or stationary object, where time-of-arrival (ToA) and Doppler measurement may be used to estimate the distance and velocity of the moving or stationary object (collectively as a target hereafter). As described in connection with FIG. 4, a network-based positioning or a UE-based positioning may also be used to determine the position of a target (e.g., the UE 404), where a network entity may transmit PRSs to a UE and/or a UE may transmit sounding reference signals (SRSs) to a network entity. Based on the measurement for the PRS/SRS, the position of the UE may be determined. However, the network-based positioning and the UE-based positioning may specify transmission of PRS/SRS and/or processing of PRS/SRS.

On the other hand, as described in connection with FIG. 5, the positioning of a passive IoT device may be based on measuring the backscattered signals (e.g., backscattering of incoming electromagnetic (EM) waves) from the passive IoT device, which may specify light to no processing of the backscattered signals. In addition, the passive IoT device may specify power harvesting (which may also be referred to as energy harvesting) and may be configured to operate under a low power. As such, in some scenarios, it may be challenging for an RFID reader (e.g., a network entity) to distinguish between reflections from a passive IoT device and reflections from other objects (e.g., ground, metal, moving vehicles, etc.).

Aspects presented herein may improve and enable the positioning of IoT devices, and specifically the positioning of passive IoT devices. Aspects presented herein may enable an entity that is receiving (or reading) reflected/backscattered signals from an IoT device to differentiate the reflected/backscattered signals from other reflections (e.g., noise or signals bounced from other objects). As such, aspects presented herein may enable a more accurate and efficient positioning of an IoT device, which may have a low-power positioning constraint and/or an energy constraint.

Figure 12:
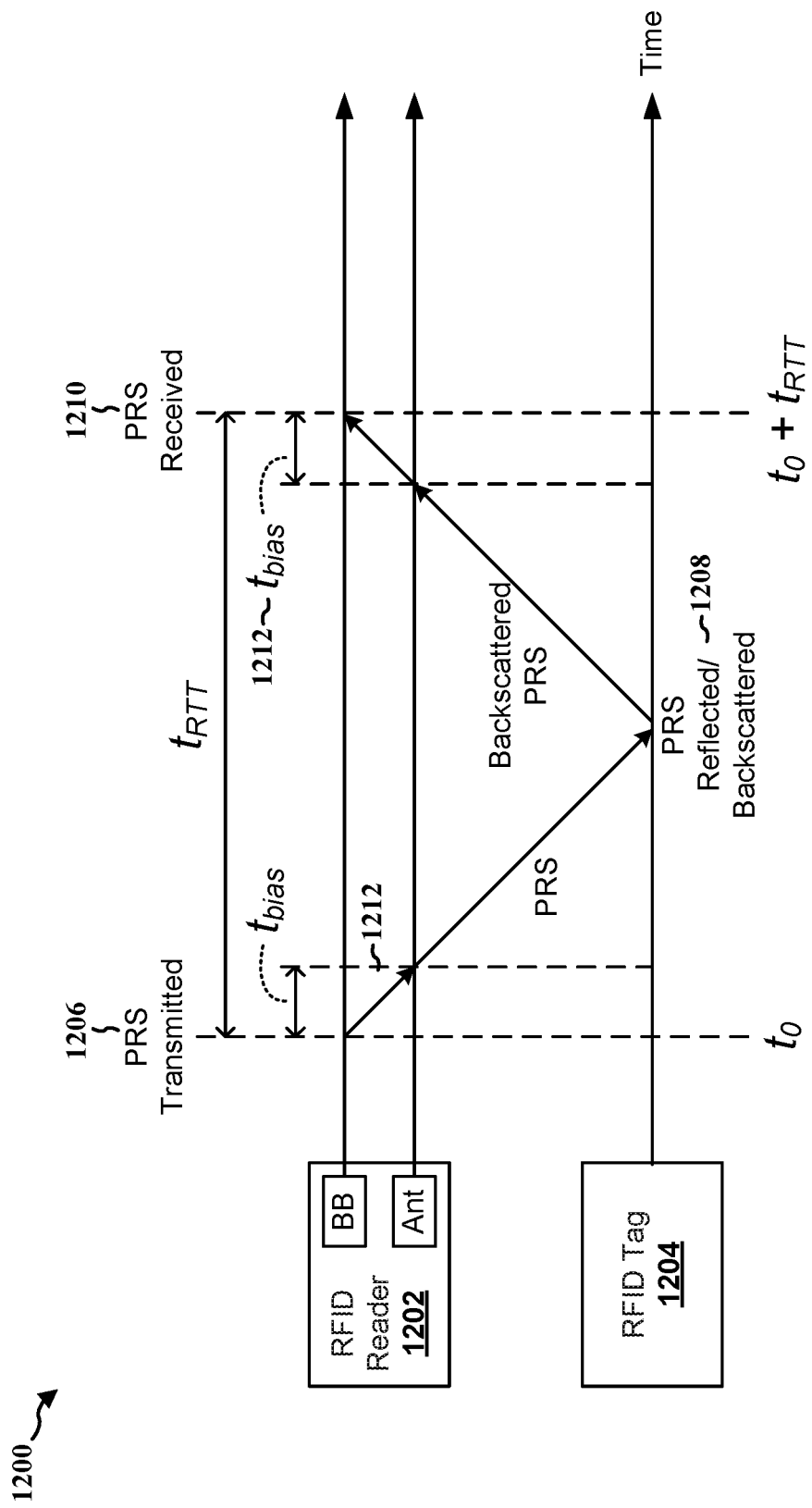
FIG. 12 is a diagram illustrating an example of determining a distance between an RFID reader and an RFID tag in accordance with various aspects of the present disclosure.

FIG. 12 is a diagram 1200 illustrating an example of determining a distance between an RFID reader and an RFID tag (which may be referred to as "backscattering-based positioning" or "RTT-based positioning" hereafter) in accordance with various aspects of the present disclosure. An RFID reader 1202, which may be a network entity (e.g., a base station, a TRP, an IAB node, etc.) or a UE, may include a baseband (BB) unit and an antenna (Ant).

In one aspect of the present disclosure, to determine a distance between the RFID reader 1202 and an RFID tag 1204 (e.g., a passive IoT device), as shown at 1206, the RFID reader 1202 may transmit a known waveform, such as a PRS, to the RFID tag 1204 and starts a timer at a first point in time ($t_0$). As described in connection with FIG. 5, the RFID tag 1204 may be configured/programmed to reflect/backscatter the PRS received from the RFID reader 1202, such as shown at 1208, where different/multiple reflection/backscattering modes may be configured for the RFID tag 1204 (discussed in details below). Then, as shown at 1210, the RFID reader 1202 may receive and measure the reflected/backscattered PRS from the RFID tag 1204, and the RFID reader 1202 may determine a reception time of the backscattered PRS at a second point in time, which may be the round-trip time (RTT) of the PRS ($t_{RTT}$) from the first point in time (e.g., reception time of PRS=$t_0+t_{RTT}$). In some scenarios, as shown at 1212, there may be a time delay ($t_{bias}$) from the time when the PRS is generated at the baseband unit to the time when the PRS is transmitted from the antenna. Similarly, when the RFID reader 1202 receives the backscattered PRS from the RFID tag 1204, there may be another time delay ($t_{bias}$) from the time when the PRS arrives at the antenna to the time when the PRS is processed and time-stamped at the baseband unit.

As such, the RFID reader 1202 may determine/estimate the distance (d) between the RFID reader 1202 and the RFID tag 1204 based on $t_{RTT}=2*t_{bias}+2*d/c$, where c is the speed of light and the value of the time delay ($t_{bias}$) may be known to the RFID reader 1202, such as via calibration with objects with known distances. There may be no processing and/or measurement of the PRS performed at RFID tag 1204. Thus, the RFID tag 1204 may not be associated with a time delay or a clock error, where the time delay may just occur at the RFID reader 1202 (e.g., between the baseband unit and the antenna).

Figure 13:
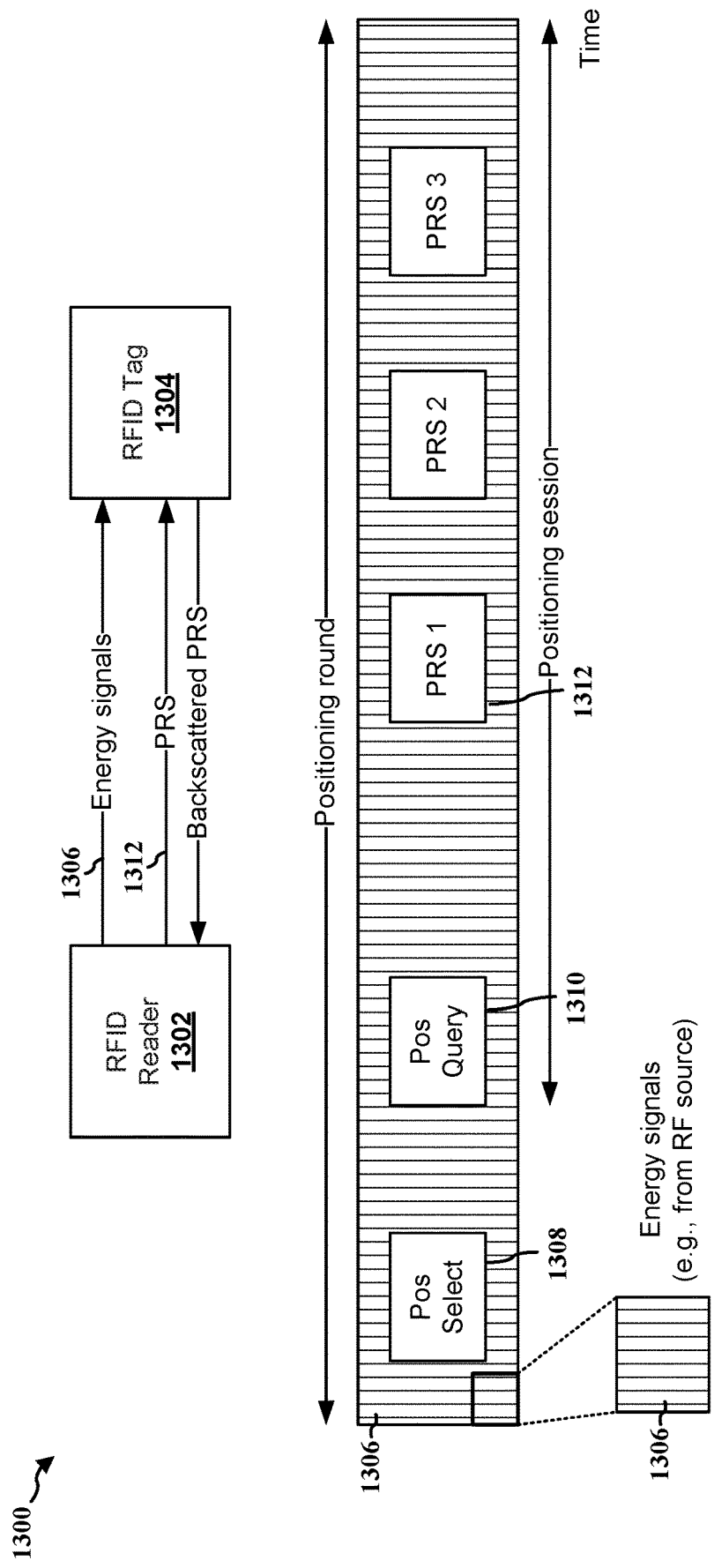
FIG. 13 is a diagram illustrating an example of energy constraints at an RFID tag during a backscattering-based positioning session in accordance with various aspects of the present disclosure.

FIG. 13 is a diagram 1300 illustrating an example of energy constraints at an RFID tag during a backscattering-based positioning session in accordance with various aspects of the present disclosure. A positioning session may refer to an occasion, an instance, or a period in which the position of a device (e.g., an IoT device, a UE, etc.) is to be determined, such as using one of the positioning mechanisms described in connection with FIG. 4. As discussed in connection with FIGS. 9 and 10, it may take time for an RFID tag (e.g., a passive IoT device) to absorb/harvest power and turn on before the RFID tag is capable of reflecting/backscattering received signals. Thus, for a backscattering-based positioning, PRS transmission timing may be considered and specified at an RFID reader based on the energy constraints at the RFID tag. For example, as shown at 1306, an RFID reader 1302 (e.g., a network entity, a UE, etc.) may transmit energy signals (e.g., CWs) to an RFID tag 1304, where the RFID tag 1304 may harvest energy from the energy signals and turn on, such as described in connection with FIG. 10. In other words, the RFID tag 1304 may be powered by the energy signals transmitted by the RFID reader 1302 during the backscattering-based positioning session.

In one aspect of the present disclosure, to enable efficient power harvesting at the RFID tag 1304 during a backscattering-based positioning session, the RFID reader 1302 may be configured to transmit the energy signals continuously during a backscattering-based positioning session or a backscattering-based positioning round (which may include multiple backscattering-based positioning sessions). Thus, the RFID reader 1302 may transmit both energy signals and PRSs to power the RFID tag 1306 during the backscattering-based positioning session/round.

In one example, as shown at 1308, the RFID reader 1302 may initiate a backscattering-based positioning round that includes multiple backscattering-based positioning sessions by transmitting a selection message (e.g., a positioning (Pos) select message) to multiple RFID tags to select a set of RFID tags, which may include the RFID tag 1304, for participating the backscattering-based positioning round/session. Then, as shown at 1310, the RFID reader 1302 may transmit a query message (e.g., a positioning query message) to the set of RFID tags selected to start a backscattering-based positioning by reflecting PRS. In one example, the query message may indicate PRS formats, duration of the PRS transmission, number of repetitions for the PRS, reflection mode(s), or a combination thereof, and the query message may also indicate the set of RFID tag to repeat the backscattering of the PRS based on the same settings/configurations for other positioning session(s) (e.g., for a new or a subsequent positioning session within the positioning round).

Then as shown at 1312, the RFID reader 1302 may start to transmit PRSs and receive backscattered PRSs from the RFID tag. In some examples, the RFID reader 1302 and the RFID tag 1304 may be configured to exchange a random number (RN) before the transmission of PRS to ensure that just the selected set of RFID tags may participate the positioning session(s). For example, the RFID reader 1302 may receive an RN from the RFID tag 1304, and transmit the same RN to the RFID tag 1304 as a handshake procedure. The RFID reader 1302 may transmit the energy signals continuously during the positioning round, such that the RFID tag 1304 is powered by the RFID reader 1302 throughout the positioning round.

Figure 14:
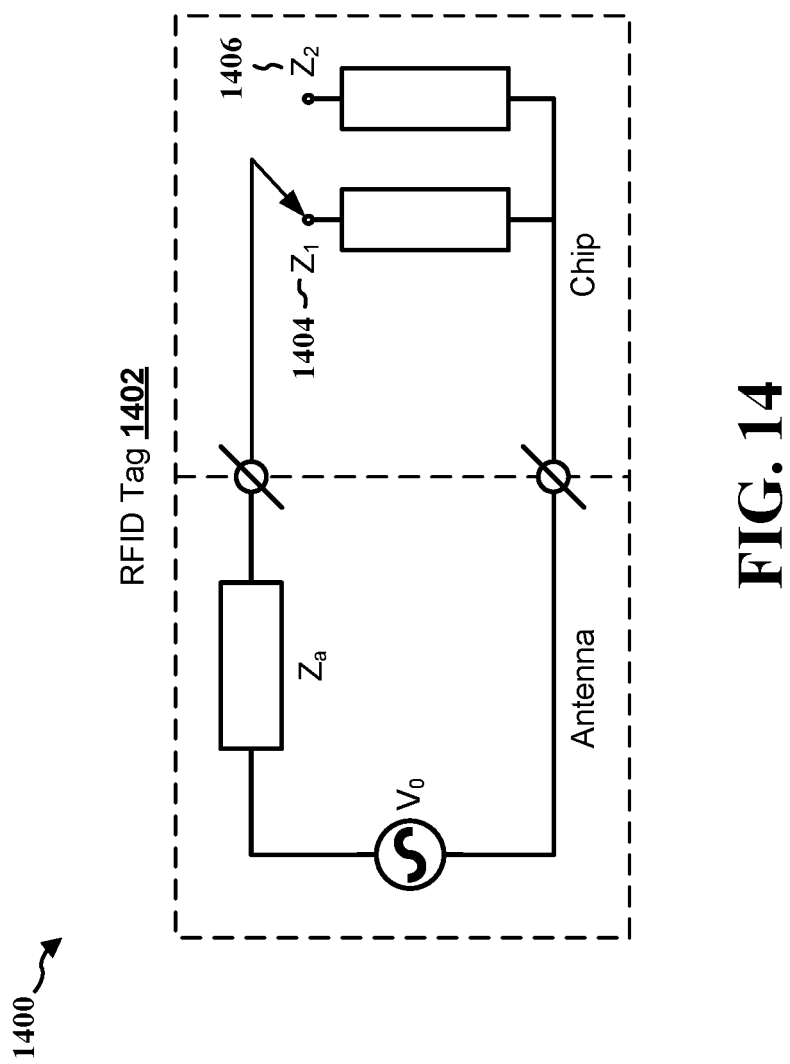
FIG. 14 is a diagram illustrating an example of an RFID tag that is capable of performing different/multiple reflection/backscattering modes in accordance with various aspects of the present disclosure.

FIG. 14 is a diagram 1400 illustrating an example of an RFID tag that is capable of performing different/multiple reflection/backscattering modes in accordance with various aspects of the present disclosure. In another aspect of the present disclosure, an RFID tag 1402 may be configured with at least three reflection/backscattering modes (e.g., after receiving a PRS), which may include a total reflection mode, an absorption mode, and an open-circuit mode.

Under the total reflection mode, the RFID tag 1402 may perform an impedance matching to achieve a maximum level of reflection after receiving a PRS. For example, as shown 1404, a first impedance $Z_1$ may be chosen for the RFID tag 1402 such that a radar cross-section (RCS) is maximized for the RFID tag 1402, where the maximum RCS (RCSmax) may be determined based on $$RCSmax = \frac{\lambda^2}{4\pi} G^2 |A_s - \Gamma_1|^2,$$

where $A_s$ is the antenna intrinsic reflection coefficient and $$\Gamma_1 = \frac{Z_1 - Z_a^*}{Z_1 + Z_a}.$$

Under the absorption mode, the RFID tag 1402 may perform an impedance matching to achieve a minimum level of reflection after receiving a PRS. For example, as shown at 1406, a second impedance $Z_2$ may be chosen for the RFID tag 1402 such that the minimum RCS (RCSmax) is minimized for the RFID tag 1402 (e.g., close to zero). In other words, after the RFID tag 1402 receives the PRS, the PRS may reflect the PRS with a minimum power, such that a corresponding RFID reader may not be able to receive/detect the backscattered PRS.

Under the open-circuit mode (which may also be referred to as an idle mode), the reflection of PRS may be caused by load-independent component (e.g., by the hardware component/casing of the RFID tag 1402), where the antenna of the RFID tag 1402 may be disconnected from the chip portion of the RFID tag 1402 causing the impedance Z between the antenna and the chip portion to be approaching infinity (e.g., Z=infinity). As such, the reflection of PRS may be similar to a signal bouncing off a target during a radar detection.

In another aspect of the present disclosure, with different reflection modes, the RFID tag 1402 may further be configured to perform a combination of reflection operations using different reflection modes for a set of (or a series of) PRSs received. As such, an RFID reader may be able to differentiate backscattered PRSs of the RFID tag 1402 from other signals (e.g., PRSs bounced off from other objects, reflection by clutters, etc.)

Figure 15:
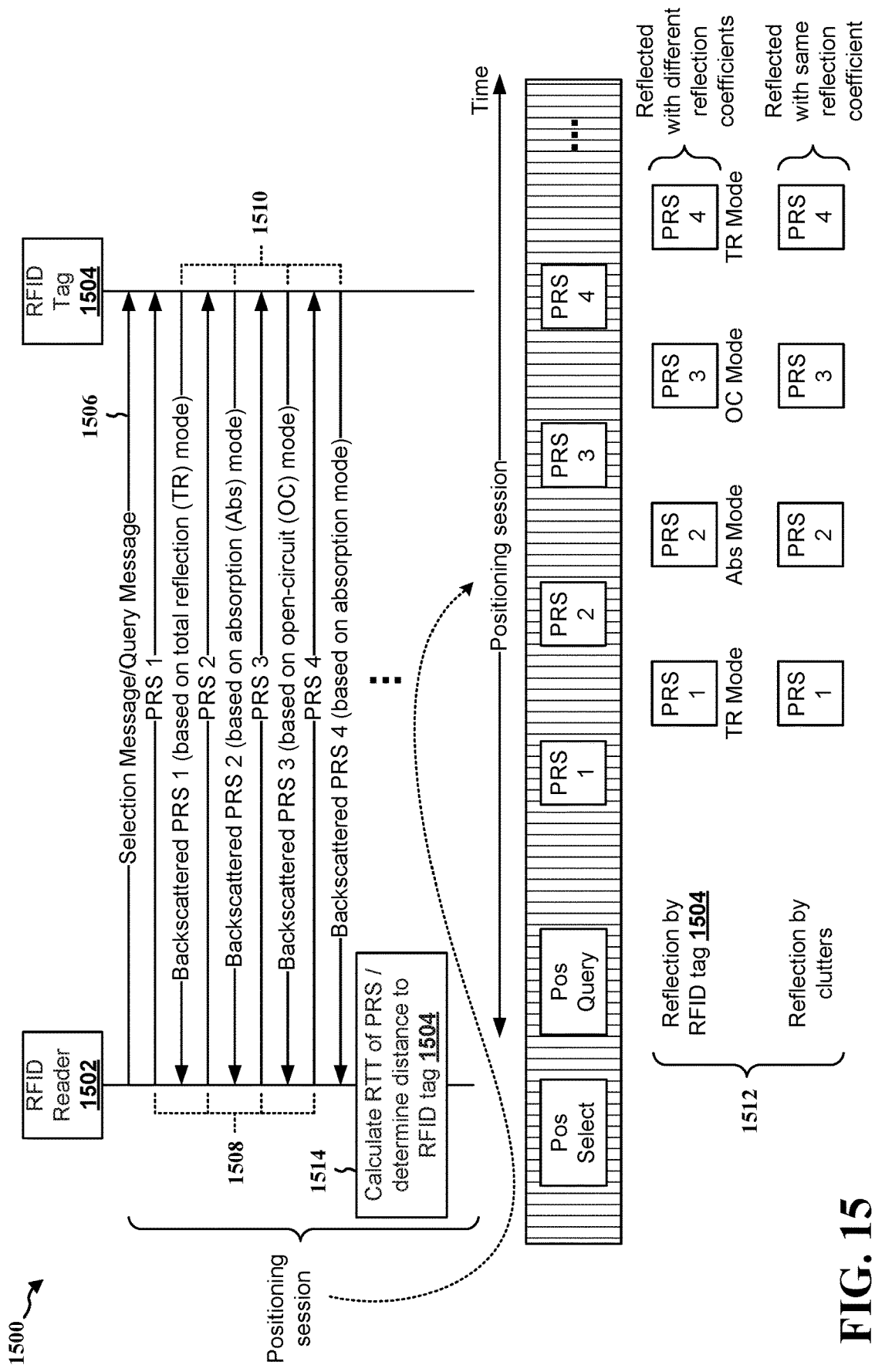
FIG. 15 is a communication flow illustrating an example of configuring an RFID tag to perform a combination of reflection/backscattering operations (which may also be referred to as a reflection pattern or a backscattering pattern) in accordance with various aspects of the present disclosure.

FIG. 15 is a communication flow 1500 illustrating an example of configuring an RFID tag to perform a combination of reflection/backscattering operations (which may also be referred to as a reflection pattern or a backscattering pattern) in accordance with various aspects of the present disclosure. The numberings associated with the communication flow 1500 do not specify a particular temporal order and are merely used as references for the communication flow 1500. Aspects presented herein may enable an RFID reader to indicate to an RFID tag to perform different reflection operations to different PRS instances. For example, an RFID tag may be configured to apply sequentially, total reflection, absorption, open-circuit, and total reflection modes to four consecutive PRSs received, respectively. Then, the RFID reader may distinguish reflected/backscattered PRSs from the RFID tag from other objects (e.g., PRSs reflected from devices other than the RFID reader, from the environment, from physical structures, etc., collectively as "reflection by clutters" hereafter) by comparing the reflected/backscattered PRSs for different PRS instances, where the reflected/backscattered PRSs may have different reflection coefficients for different PRS instances and reflections by clutters are more likely to have the same reflection coefficient throughout different PRS instances.

For purposes of the present disclosure, a reflection coefficient may refer to a parameter that describes how much of a wave or signal is reflected by an impedance discontinuity in a transmission medium. In one example, the reflection coefficient may equal to the ratio of the amplitude of a reflected wave (e.g., a reflected/backscattered PRS) to the incident wave (e.g., a PRS from the RFID reader), with each expressed as phasors.

At 1506, an RFID reader 1502 may transmit an indication of a backscattering-based positioning session/round to an RFID tag 1504 (e.g., a passive IoT device) to initiate a positioning session for the RFID tag 1504. For example, the RFID reader 1502 may transmit a selection message to select a set of RFID tags including the RFID tag 1504, and a query message to the set of RFID tags selected to start a backscattering-based positioning session by reflecting PRS, such as described in connection with FIG. 13. The indication of the backscattering-based positioning session/round may also include a reflection/backscattering pattern (e.g., for a consecutive number of PRSs), a format for a set of PRSs, a duration for transmitting the of PRSs, a number of repetitions for the set of PRSs, a number of the transmission occasions for the set of PRSs, one or more reflection modes to be used for reflecting the set of PRSs, or a combination thereof. In some examples, in response to the indication, the RFID tag 1504 may transmit an acknowledgement to participate the positioning session to the RFID reader 1502, where the RFID reader 1502 may select the RFID tag 1504 based on the acknowledgement.

At 1508, the RFID reader 1502 may transmit the set of PRSs to the RFID tag 1504 during the backscattering-based positioning session. For example, the RFID reader 1502 may transmit the set of PRSs via multiple transmission occasions (which may also be referred to as PRS instances or PRS occasions), such as a first PRS (PRS 1) at a first transmission instance or a first point in time, a second PRS (PRS 2) at a second transmission instance or a second point in time, a third PRS (PRS 3) at a third transmission instance or a third point in time, and up to $N^{th}$ PRS (PRS N) at a $N^{th}$ transmission instance or a $N^{th}$ point in time, etc. during the backscattering-based positioning session.

At 1510, based on the reflection/backscattering pattern configured for the RFID tag 1504 (which may be received via the indication at 1504 or pre-configured/defined at the RFID tag 1504), the RFID tag 1504 may reflect/backscatter the set of PRSs based on the reflection/backscattering pattern. For example, the reflection/backscattering pattern may specify the RFID tag 1504 to apply a combination of reflection/backscattering operations to every four (4) consecutive PRSs received, where the total reflection mode is applied to the first PRS (of the four consecutive PRSs), the absorption mode is applied to the second PRS, the open-circuit mode is applied to the third PRS, and the total reflection mode is applied to the fourth PRS, such as described in connection with FIG. 14. Then, the RFID tag 1504 may apply the configured reflection/backscattering pattern to every four PRSs it receives, such as performing total reflection, absorption, open-circuit, and total reflection to every four PRSs.

Base on the reflection/backscattering pattern applied by the RFID tag 1504 to the set of PRSs, the RFID reader 1502 may be able distinguish the reflected/backscattered PRSs from reflection by clutters. For example, as shown at 1512, PRSs reflected/backscattered by the RFID tag 1504 at different PRS instances are likely to have different reflection coefficients (e.g., a higher coefficient for the total reflection mode, a lower coefficient for the absorption mode, etc.), whereas PRSs reflected by other objects at different PRS instances are likely to have the same reflection coefficient. Also, reflections from clutters may be canceled out by subtracting the received reflections from PRS instances 1 and 3 as reflections based on the open-circuit mode is likely to be similar to reflections by clutters. In addition, as there may be RFID tags that are not participating the backscattered positioning session/round (which may be referred to as non-participating tags), the RFID reader 1502 may be able to estimate these non-participating tags by comparing PRS reflection at PRS instances 2 and 3, where RFID tags that are not selected for the backscattered positioning session/round may be configured/specified to operate in an absorption mode and/or an idle mode for one or more PRS instances (e.g., the reflect pattern(s) may be pre-configured for the non-participating tags or indicated to them).

At 1514, based on identifying PRSs reflected/backscattered from the RFID tag 1504, the RFID reader 1502 may measure the reflected/backscattered PRSs to determine/estimate the position of the RFID tag 1504. For example, as described in connection with FIG. 12, the RFID reader 1502 may measure the RTT for at least one of the PRSs received, and the RFID reader 1502 may calculate a distance between the RFID reader 1502 and the RFID tag 1504 based on the RTT. In some scenarios, the RFID reader 1502 may also be capable of determining/estimating the position of the RFID tag. For example, after knowing the distance between the RFID reader 1502 and the RFID tag 1504, if the direction of the reflected/backscattered PRS is also known, or the distance(s) between the RFID tag 1504 to other RFID reader(s) are also known, then the position or the relative position of the RFID tag 1504 may be determined, such as described in connection with FIG. 4.

In another aspect of the present disclosure, as the RFID tag 1504 may be configured to reflect/backscatter PRSs with different reflection modes at different PRS instances, the RFID reader 1502 may also be configured to select a specified reflected/backscattered PRS or combine multiple reflected/backscattered PRSs for measurement to enhance positioning accuracy. For example, as reflection based on the total reflection mode likely will provide higher reflection coefficient, the RFID reader 1502 may be configured to just measure reflected/backscattered PRSs based on the total reflection mode (e.g., measuring the first backscattered PRS and the fourth backscattered PRS). In another example, the RFID reader 1502 may combine reflections/measurements from PRS instances 1 and 4 (e.g., the first backscattered PRS and the fourth backscattered PRS) to improve positioning measurements.

Figure 16:
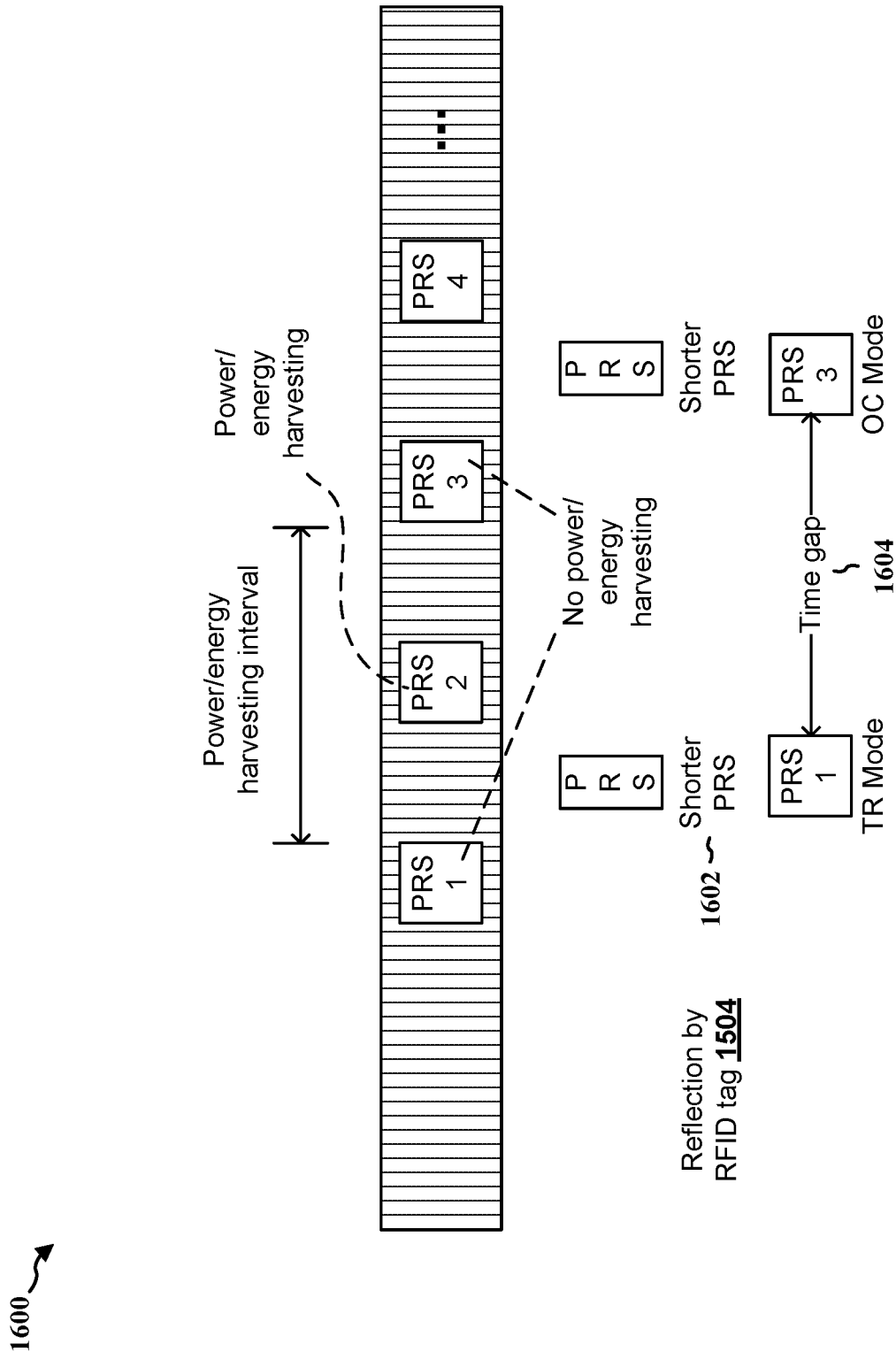
FIG. 16 is a diagram illustrating an example of wireless power transfer considerations associated with an RFID tag in accordance with various aspects of the present disclosure.

FIG. 16 is a diagram 1600 illustrating an example of wireless power transfer considerations associated with an RFID tag in accordance with various aspects of the present disclosure. In some scenarios, an RFID tag (e.g., the RFID tag 1504) may not be able to perform power harvesting when the RFID tag is reflecting/backscattering a PRS based on the total reflection mode and/or the idle mode, where power received from the RFID reader may either be reflected/backscattered back to RFID reader or disconnected from the power harvesting circuitry (as shown at FIGS. 9 and 14). As such, an RFID tag may be configured to transmit short PRSs (e.g., PRSs with shorter durations) or an RFID reader (e.g., the RFID reader 1502) may be specified to configure a sufficient (e.g., longer) time gap(s) between consecutive PRSs for the RFID tag to enable the RFID tag to have the opportunity to harvest power from energy signals (between different PRS instances). Whether to configure short PRSs or a longer time gap between consecutive PRSs for an RFID tag may depend on the capability of the RFID tag.

For example, as shown at 1602, to enable sufficient power/energy harvesting at an RFID tag, the RFID tag may be configured to transmit a shorter PRS, where the PRS duration may be specified not to be longer than X milliseconds (ms) within which the RFID tag's voltage and power may drop by Y %. This X value may depend on the type of the RFID tag (e.g., a passive IoT, a semi-passive IoT, an active IoT, and/r its capability to store energy or has another power source, etc. as described in connection with FIG. 6). For RFID tags with storage or battery, the PRS transmission duration may be longer, whereas for RFID tags without storage or battery, the PRS transmission duration may be shorter in comparison.

In another example, as shown at 1604, the time gap between PRS instances where an RFID tag is configured to reflect/backscatter PRS based on the total reflection mode and/or the open circuit mode may be configured to be larger than a time threshold (e.g., at least X ms) to provide the RFID tag with sufficient time to perform power harvesting and/or maintaining chip voltage at the RFID tag. On the other hand, when an RFID tag is configured to reflect/backscatter a PRS based on the absorption mode, the RFID tag may still harvest energy. Therefore, the inter-PRS time gap may change depending on the reflection modes (e.g., loner time gaps for the total reflection mode and the open-circuit mode, and shorter time gaps for the absorption mode, etc.).

Figure 17:
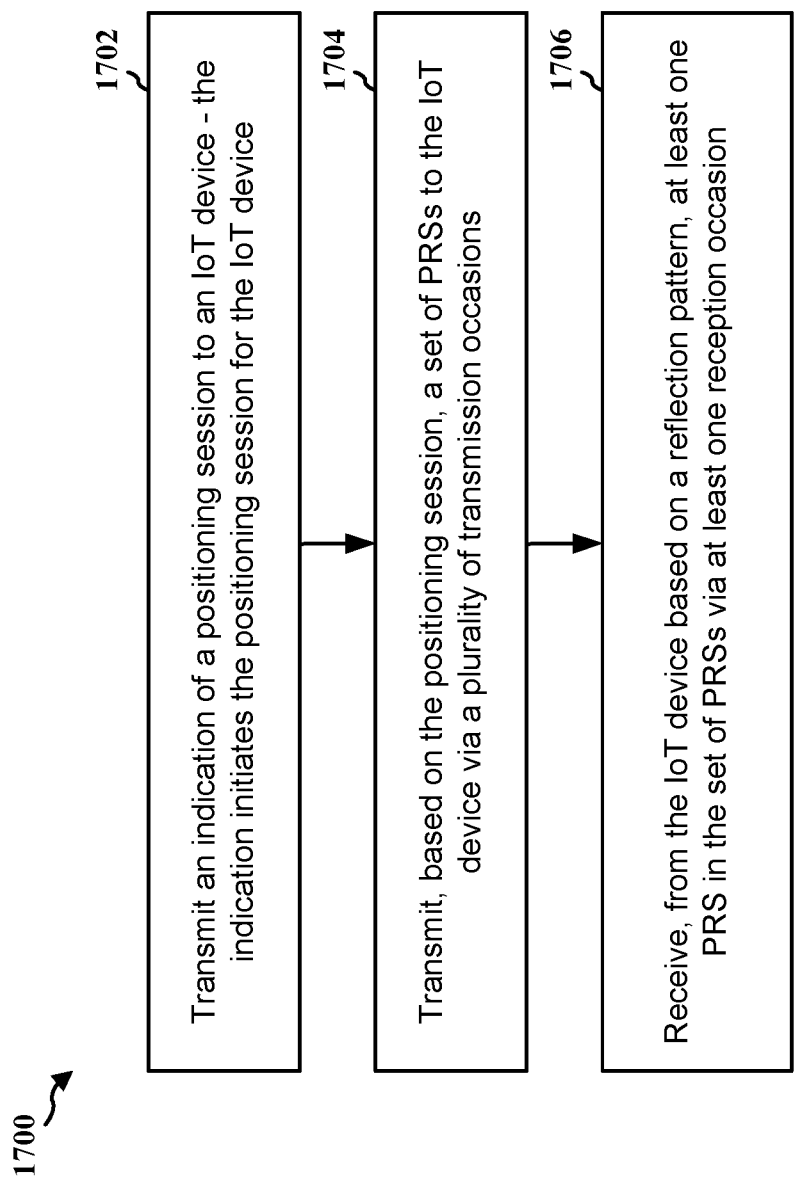
FIG. 17 is a flowchart of a method of wireless communication.

FIG. 17 is a flowchart 1700 of a method of wireless communication. In some scenarios, the method may be performed by a wireless device (e.g., the UE 104, 404; the base station 102; the RFID reader 504, 1202, 1302, 1502; the apparatus 1804; the network entity 1902). The method may enable the wireless device (e.g., a base station, a component of a base station, a TRP, a UE, etc.) to differentiate the reflected/backscattered signals from an IoT device with signals reflected from other objects during a backscattering-based positioning session for the IoT device.

At 1702, the wireless device may transmit an indication of a positioning session to an IoT device, where the indication initiates the positioning session for the IoT device, such as described in connection with FIGS. 13 and 15. For example, at 1506 of FIG. 15, the RFID reader 1502 may transmit an indication of a backscattering-based positioning session/round to the RFID tag 1504 to initiate the backscattering-based positioning session/round for the RFID tag 1504. The transmission of the indication may be performed by, e.g., the RFID reading component 198/199, the cellular baseband processor 1824 and/or the transceiver(s) 1822 of the apparatus 1804 in FIG. 18, or the transceiver(s) 1946 of the network entity 1902 in FIG. 19.

At 1704, the wireless device may transmit, based on the positioning session, a set of PRSs to the IoT device via a plurality of transmission occasions, such as described in connection with FIGS. 13 and 15. For example, at 1508 of FIG. 15, the RFID reader 1502 may transmit a set of PRSs to the RFID tag 1504 via a plurality of transmission occasions. The transmission of the set of PRSs may be performed by, e.g., the RFID reading component 198/199, the cellular baseband processor 1824 and/or the transceiver(s) 1822 of the apparatus 1804 in FIG. 18, or the transceiver(s) 1946 of the network entity 1902 in FIG. 19.

At 1706, the wireless device may receive, from the IoT device based on a reflection pattern, at least one PRS in the set of PRSs via at least one reception occasion, such as described in connection with FIGS. 13 and 15. For example, at 1510 of FIG. 15, the RFID reader 1502 may receive at least one PRS from the RFID tag 1504 based on a reflection pattern. The reception of the at least one PRS in the set of PRSs may be performed by, e.g., the RFID reading component 198/199, the cellular baseband processor 1824 and/or the transceiver(s) 1822 of the apparatus 1804 in FIG. 18, or the transceiver(s) 1946 of the network entity 1902 in FIG. 19.

In one example, the wireless device may detect that the at least one PRS is reflected from the IoT device based on one or more of the reflection pattern or the at least one reception occasion.

In another example, the wireless device may calculate a position of the IoT device based on an RTT of the at least one PRS in the set of PRSs. In such an example, calculating the position of the IoT device may include calculating a distance between the wireless device and the IoT device based on the RTT of the at least one PRS in the set of PRSs. In such an example, the distance between the wireless device and the IoT device is calculated based on $t_{RTT}-2*t_{bias}+2*d/c$, d being the distance between the wireless device and the IoT device, $t_{RTT}$ being the RTT of the at least one PRS, $t_{bias}$ being a bias associated with transmitting and receiving at least one PRS, and c being a speed of light. In such an example, the wireless device may determine the bias ($t_{bias}$) associated with transmitting and receiving the at least one PRS via calibration with one or more objects with known distances.

In another example, the indication includes at least one of: the reflection pattern, a format for the set of PRSs, a duration for transmitting the set of PRSs, a number of repetitions for the set of PRSs, a number of the transmission occasions for the set of PRSs, or one or more modes associated with reflection operations of the set of PRSs. In such an example, the indication is transmitted to a plurality of IoT devices, and the wireless device may receive an acknowledgement from at least the IoT device to participate the positioning session and select at least the IoT device among the plurality of IoT devices for the positioning session.

In another example, the reflection pattern is associated with a combination of reflection operations from the IoT device during the plurality of reception occasions, and where the reflection operations include at least one of: a total reflection, an absorption, or an open-circuit.

In another example, the set of PRSs is transmitted via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

In another example, the wireless device is a UE, a network node, a network entity, a TRP, or a base station.

Figure 18:
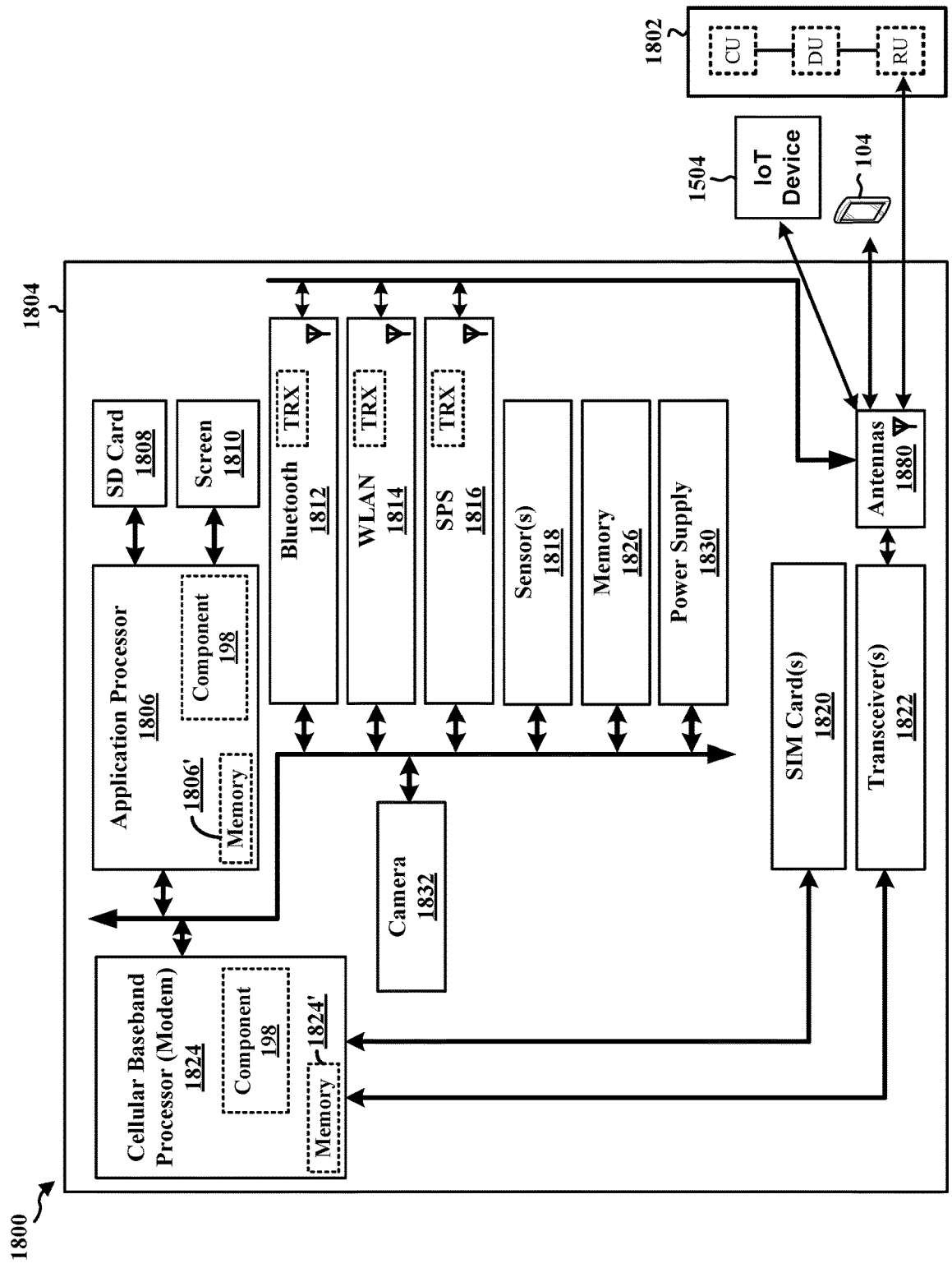
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see 350 of FIG. 3) and include the additional modules of the apparatus 1804.

Figure 19:
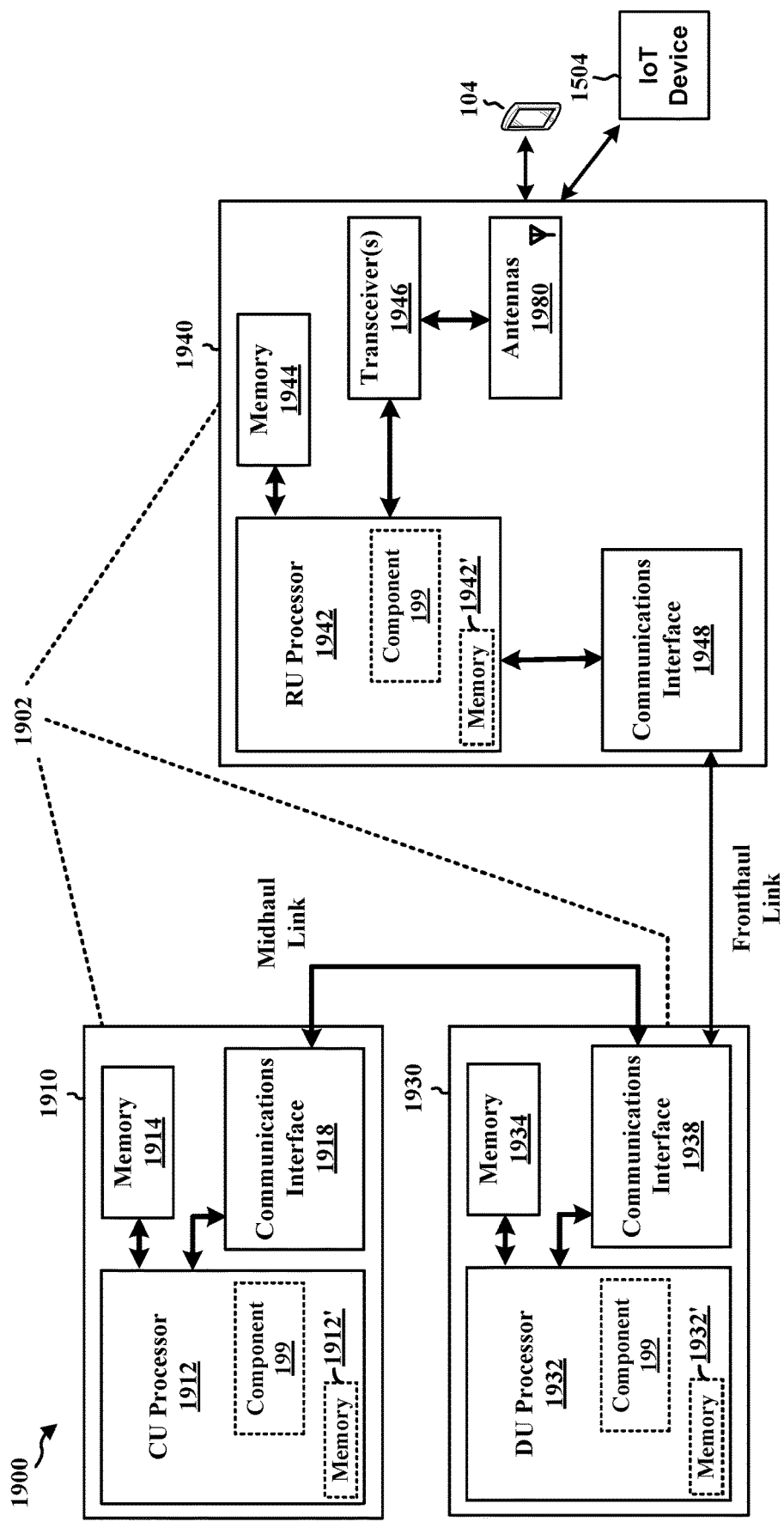
FIG. 19 is a diagram illustrating an example of a hardware implementation for an example apparatus and/or network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the RFID reading component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory.

Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the RFID reading component 198/199 is configured to transmit an indication of a positioning session to an IoT device, where the indication initiates the positioning session for the IoT device. The RFID reading component 198/199 may also be configured to transmit, based on the positioning session, a set of PRSs to the IoT device via a plurality of transmission occasions. The RFID reading component 198/199 may also be configured to receive, from the IoT device based on a reflection pattern, at least one PRS in the set of PRSs via at least one reception occasion. The RFID reading component 198 may be within the cellular baseband processor 1824, the application processor 1806, or both the cellular baseband processor 1824 and the application processor 1806. The RFID reading component 198 may be one or more hardware components specifically configured to carry out the stated processes/algorithm, implemented by one or more processors configured to perform the stated processes/algorithm, stored within a computer-readable medium for implementation by one or more processors, or some combination thereof. The RFID reading component 199 may be within one or more processors of one or more of the CU 1910, DU 1930, and the RU 1940. The RFID reading component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions.

As shown, the apparatus 1804 or the network entity 1902 may include a variety of components configured for various functions. In one configuration, the network entity 1902 or the apparatus 1804 (in particular the cellular baseband processor 1824 and/or the application processor 1806), includes means for transmitting an indication of a positioning session to an IoT device, where the indication initiates the positioning session for the IoT device. The apparatus 1804 or the network entity 1902 may further include means for transmitting, based on the positioning session, a set of PRSs to the IoT device via a plurality of transmission occasions. The apparatus 1804 or the network entity 1902 may further include means for receiving, from the IoT device based on a reflection pattern, at least one PRS in the set of PRSs via at least one reception occasion.

In one configuration, the apparatus 1804 or the network entity 1902 may further include means for detecting that the at least one PRS is reflected from the IoT device based on one or more of the reflection pattern or the at least one reception occasion.

In another configuration, the apparatus 1804 or the network entity 1902 may further include means for calculating a position of the IoT device based on an RTT of the at least one PRS in the set of PRSs. In such a configuration, the means for calculating the position of the IoT device may include configuring the apparatus 1804 or the network entity 1902 to calculate a distance between the wireless device and the IoT device based on the RTT of the at least one PRS in the set of PRSs. In such a configuration, the distance between the wireless device and the IoT device is calculated based on $t_{RTT}=2*t_{bias}+2*d/c$, d being the distance between the wireless device and the IoT device, $t_{RTT}$ being the RTT of the at least one PRS, $t_{bias}$ being a bias associated with transmitting and receiving at least one PRS, and c being a speed of light. In such a configuration, the apparatus 1804 or the network entity 1902 may further include means for determining the bias ($t_{bias}$) associated with transmitting and receiving the at least one PRS via calibration with one or more objects with known distances.

In another configuration, the indication includes at least one of: the reflection pattern, a format for the set of PRSs, a duration for transmitting the set of PRSs, a number of repetitions for the set of PRSs, a number of the transmission occasions for the set of PRSs, or one or more modes associated with reflection operations of the set of PRSs. In such a configuration, the indication is transmitted to a plurality of IoT devices, and the wireless device may receive an acknowledgement from at least the IoT device to participate the positioning session and select at least the IoT device among the plurality of IoT devices for the positioning session.

In another configuration, the reflection pattern is associated with a combination of reflection operations from the IoT device during the plurality of reception occasions, and where the reflection operations include at least one of: a total reflection, an absorption, or an open-circuit.

In another configuration, the set of PRSs is transmitted via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

In another configuration, the wireless device is a UE, a network node, a network entity, a TRP, or a base station.

In some examples, the means may be the RFID reading component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means. In other examples, the means may be the RFID reading component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
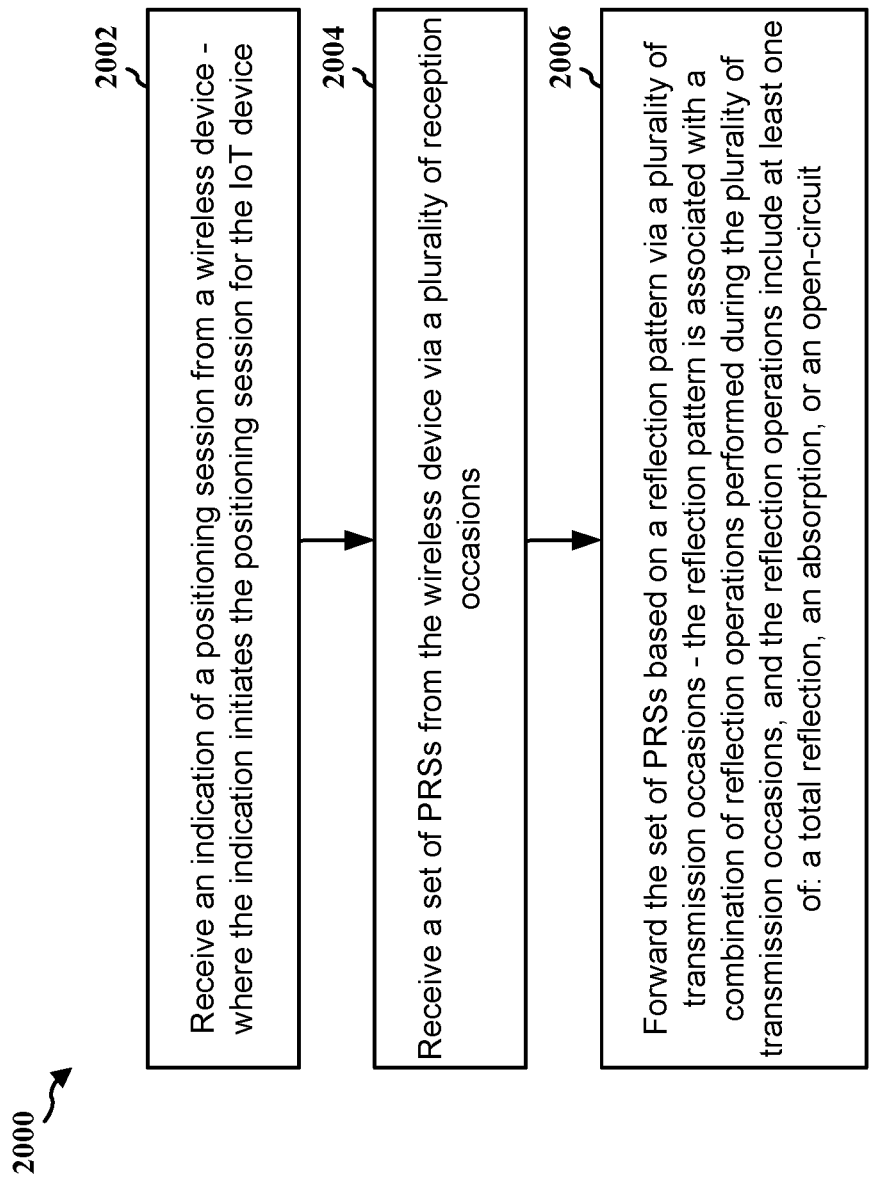
FIG. 20 is a flowchart 2000 of a method of wireless communication.

FIG. 20 is a flowchart 2000 of a method of wireless communication. The method may be performed by an IoT device (e.g., the RFID tag 502, 704, 1204, 1304, 1402, 1504; the passive IoT device 602; the active IoT device 610; the apparatus 2104). The method may enable the IoT device to reflect/backscatter signals with a reflection pattern (e.g., with different reflection modes), thereby enable an RFID reader to differentiate signals from the IoT device from signals reflected from other objects.

At 2002, the IoT device may receive an indication of a positioning session from a wireless device, where the indication initiates the positioning session for the IoT device, such as described in connection with FIGS. 13 and 15. For example, at 1506 of FIG. 15, the RFID tag 1504 may receive an indication of a backscattering-based positioning session/round from the RFID reader 1502 to initiate the backscattering-based positioning session/round for the RFID tag 1504. The reception of the indication may be performed by, e.g., the backscattering component 197, the cellular baseband processor 2124, and/or the transceiver(s) 2122 of the apparatus 2104 in FIG. 21.

At 2004, the IoT device may receive a set of PRSs from the wireless device via a plurality of reception occasions, such as described in connection with FIGS. 13 and 15. For example, at 1508 of FIG. 15, the RFID tag 1504 may receive a set of PRSs from the RFID reader 1502 a plurality of reception occasions. The reception of the set of PRSs may be performed by, e.g., the backscattering component 197, the cellular baseband processor 2124, and/or the transceiver(s) 2122 of the apparatus 2104 in FIG. 21.

At 2006, the IoT device may forward the set of PRSs based on a reflection pattern via a plurality of transmission occasions, where the reflection pattern is associated with a combination of reflection operations performed during the plurality of transmission occasions, where the reflection operations include at least one of: a total reflection, an absorption, or an open-circuit, such as described in connection with FIGS. 13 and 15. For example, at 1510 of FIG. 15, the RFID tag 1504 may reflect/backscatter at least one PRS to the RFID reader 1502 based on a reflection pattern, where the reflection pattern may include a total reflection, an absorption, and/or an open-circuit. The forwarding of the set of PRSs may be performed by, e.g., the backscattering component 197, the cellular baseband processor 2124, and/or the transceiver(s) 2122 of the apparatus 2104 in FIG. 21.

In one example, to forward the set of PRSs based on a reflection pattern, the IoT device may reflect or backscatter the set of PRSs based on a reflection pattern.

In another example, the IoT device may receive an indication from the wireless device to initiate a positioning session for the IoT device, where the indication includes at least one of: the reflection pattern, a format for the set of PRSs, a duration for receiving the set of PRSs, a number of repetitions for the set of PRSs, a number of transmission occasions for the set of PRSs, or one or more modes associated with reflection operations of the set of PRSs.

In another example, the set of PRSs are received via the plurality of reception occasions with a time gap between two consecutive reception occasions, the time gap being based on a type of the IoT device, a storage associated with the IoT, availability of a power source at the IoT device, a time specified by the IoT device to perform power harvesting, or a combination thereof.

In another example, the wireless device is a UE, a network node, a network entity, a TRP or a base station.

Figure 21:
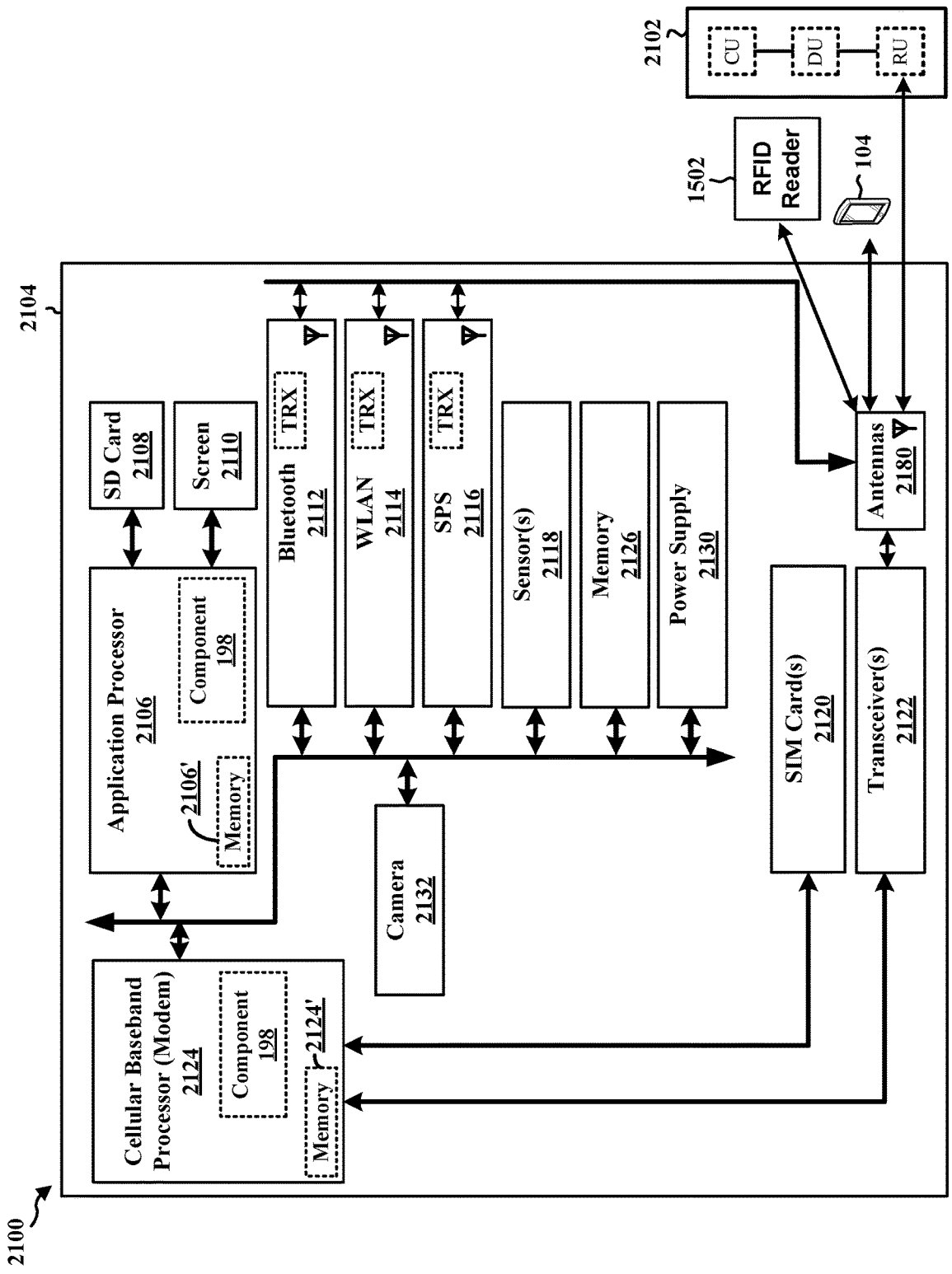
FIG. 21 is a diagram illustrating an example of a hardware implementation for an example apparatus and/or network entity.

FIG. 21 is a diagram 2100 illustrating an example of a hardware implementation for an apparatus 2104. The apparatus 2104 may be a UE, a component of a UE, or may implement UE functionality. In some aspects, the apparatus 2104 may include a cellular baseband processor 2124 (also referred to as a modem) coupled to one or more transceivers 2122 (e.g., cellular RF transceiver). The cellular baseband processor 2124 may include on-chip memory 2124'. In some aspects, the apparatus 2104 may further include one or more subscriber identity modules (SIM) cards 2120 and an application processor 2106 coupled to a secure digital (SD) card 2108 and a screen 2110. The application processor 2106 may include on-chip memory 2106'. In some aspects, the apparatus 2104 may further include a Bluetooth module 2112, a WLAN module 2114, an SPS module 2116 (e.g., GNSS module), one or more sensor modules 2118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2126, a power supply 2130, and/or a camera 2132. The Bluetooth module 2112, the WLAN module 2114, and the SPS module 2116 may include an on-chip transceiver (TRX) (or in some cases, just a receiver (RX)). The Bluetooth module 2112, the WLAN module 2114, and the SPS module 2116 may include their own dedicated antennas and/or utilize the antennas 2180 for communication. The cellular baseband processor 2124 communicates through the transceiver(s) 2122 via one or more antennas 2180 with the UE 104 and/or with an RU associated with a network entity 2102. The cellular baseband processor 2124 and the application processor 2106 may each include a computer-readable medium/memory 2124', 2106', respectively. The additional memory modules 2126 may also be considered a computer-readable medium/memory. Each computer-readable medium/memory 2124', 2106', 2126 may be non-transitory. The cellular baseband processor 2124 and the application processor 2106 are each responsible for general processing, including the execution of software stored on the computer-readable medium/memory. The software, when executed by the cellular baseband processor 2124/application processor 2106, causes the cellular baseband processor 2124/application processor 2106 to perform the various functions described supra. The computer-readable medium/memory may also be used for storing data that is manipulated by the cellular baseband processor 2124/application processor 2106 when executing software. The cellular baseband processor 2124/application processor 2106 may be a component of the UE 350 and may include the memory 360 and/or at least one of the TX processor 368, the RX processor 356, and the controller/processor 359. In one configuration, the apparatus 2104 may be a processor chip (modem and/or application) and include just the cellular baseband processor 2124 and/or the application processor 2106, and in another configuration, the apparatus 2104 may be the entire UE (e.g., see 350 of FIG. 3) and include the additional modules of the apparatus 2104.

As discussed supra, the backscattering component 197 is configured to receive an indication of a positioning session from a wireless device, where the indication initiates the positioning session for the IoT device. The backscattering component 197 may also be configured to receive a set of PRSs from the wireless device via a plurality of reception occasions. The backscattering component 197 may also be configured to forward the set of PRSs based on a reflection pattern via a plurality of transmission occasions, where the reflection pattern is associated with a combination of reflection operations performed during the plurality of transmission occasions, where the reflection operations include at least one of: a total reflection, an absorption, or an open-circuit. The backscattering component 197 may be within the cellular baseband processor 2124, the application processor 2106, or both the cellular baseband processor 2124 and the application processor 2106. The backscattering component 197 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2104 may include a variety of components configured for various functions. In one configuration, the apparatus 2104, and in particular the cellular baseband processor 2124 and/or the application processor 2106, includes means for receiving an indication of a positioning session from a wireless device, where the indication initiates the positioning session for the IoT device. The apparatus 2104 may further include means for receiving a set of PRSs from the wireless device via a plurality of reception occasions. The apparatus 2104 may further include means for forwarding the set of PRSs based on a reflection pattern via a plurality of transmission occasions, where the reflection pattern is associated with a combination of reflection operations performed during the plurality of transmission occasions, where the reflection operations include at least one of: a total reflection, an absorption, or an open-circuit.

In one configuration, the means for forwarding the set of PRSs based on a reflection pattern includes configuring the apparatus 2104 to reflect or backscatter the set of PRSs based on a reflection pattern.

In another configuration, the apparatus 2104 may further include means for receiving an indication from the wireless device to initiate a positioning session for the IoT device, where the indication includes at least one of: the reflection pattern, a format for the set of PRSs, a duration for receiving the set of PRSs, a number of repetitions for the set of PRSs, a number of transmission occasions for the set of PRSs, or one or more modes associated with reflection operations of the set of PRSs.

In another configuration, the set of PRSs are received via the plurality of reception occasions with a time gap between two consecutive reception occasions, the time gap being based on a type of the IoT device, a storage associated with the IoT, availability of a power source at the IoT device, a time specified by the IoT device to perform power harvesting, or a combination thereof.

In another configuration, the wireless device is a UE, a network node, a network entity, a TRP or a base station.

The means may be the backscattering component 197 of the apparatus 2104 configured to perform the functions recited by the means. As described supra, the apparatus 2104 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including: transmitting an indication of a positioning session to an IoT device, where the indication initiates the positioning session for the IoT device; transmitting, based on the positioning session, a set of PRSs to the IoT device via a plurality of transmission occasions; and receiving, from the IoT device based on a reflection pattern, at least one PRS in the set of PRSs via at least one reception occasion.

Aspect 2 is the method of aspect 1, further including: detecting that the at least one PRS is reflected from the IoT device based on one or more of the reflection pattern or the at least one reception occasion.

Aspect 3 is the method of aspect 1 or 2, further including: calculating a position of the IoT device based on an RTT of the at least one PRS in the set of PRSs.

Aspect 4 is the method of aspect 3, where calculating the position of the IoT device includes: calculating a distance between the wireless device and the IoT device based on the RTT of the at least one PRS in the set of PRSs.

Aspect 5 is the method of aspect 4, where the distance between the wireless device and the IoT device is calculated based on $t_{RTT}=2*t_{bias}+2*d/c$, d being the distance between the wireless device and the IoT device, $t_{RTT}$ being the RTT of the at least one PRS, $t_{bias}$ being a bias associated with transmitting and receiving at least one PRS, and c being a speed of light.

Aspect 6 is the method of aspect 5, further including: determining the bias ($t_{bias}$) associated with transmitting and receiving the at least one PRS via calibration with one or more objects with known distances.

Aspect 7 is the method of any of aspects 1 to 6, where the indication includes at least one of: the reflection pattern, a format for the set of PRSs, a duration for transmitting the set of PRSs, a number of repetitions for the set of PRSs, a number of the transmission occasions for the set of PRSs, or one or more modes associated with reflection operations of the set of PRSs.

Aspect 8 is the method of aspect 7, where the indication is transmitted to a plurality of IoT devices, the method further including: receiving an acknowledgement from at least the IoT device to participate the positioning session; and selecting at least the IoT device among the plurality of IoT devices for the positioning session.

Aspect 9 is the method of any of aspects 1 to 8, where the reflection pattern is associated with a combination of reflection operations from the IoT device during the plurality of reception occasions, and where the reflection operations include at least one of: a total reflection, an absorption, or an open-circuit.

Aspect 10 is the method of any of aspects 1 to 9, where the set of PRSs is transmitted via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

Aspect 11 is the method of aspect 10, where the wireless device is a UE, a network node, a network entity, a TRP, or a base station.

Aspect 12 is an apparatus for wireless communication at a wireless device, including: a memory; and at least one processor coupled to the memory and, based at least in part on information stored in the memory, the at least one processor is configured to implement any of aspects 1 to 11.

Aspect 13 is the apparatus of aspect 12, further including at least one of a transceiver or an antenna coupled to the at least one processor.

Aspect 14 is an apparatus for wireless communication including means for implementing any of aspects 1 to 11.

Aspect 15 is a computer-readable medium (e.g., a non-transitory computer-readable medium) storing computer executable code, where the code when executed by a processor causes the processor to implement any of aspects 1 to 11.

Aspect 16 is a method of wireless communication at an IoT device, including: receiving an indication of a positioning session from a wireless device, where the indication initiates the positioning session for the IoT device; receiving a set of PRSs from the wireless device via a plurality of reception occasions; and forwarding the set of PRSs based on a reflection pattern via a plurality of transmission occasions, where the reflection pattern is associated with a combination of reflection operations performed during the plurality of transmission occasions, where the reflection operations include at least one of: a total reflection, an absorption, or an open-circuit.

Aspect 17 is the method of aspect 16, where forwarding the set of PRSs based on a reflection pattern includes: reflecting or backscattering the set of PRSs based on a reflection pattern.

Aspect 18 is the method of aspect 16 or aspect 17, further including: receiving an indication from the wireless device to initiate a positioning session for the IoT device, where the indication includes at least one of: the reflection pattern, a format for the set of PRSs, a duration for receiving the set of PRSs, a number of repetitions for the set of PRSs, a number of transmission occasions for the set of PRSs, or one or more modes associated with reflection operations of the set of PRSs.

Aspect 19 is the method of any of aspects 16 to 18, where the set of PRSs are received via the plurality of reception occasions with a time gap between two consecutive reception occasions, the time gap being based on a type of the IoT device, a storage associated with the IoT, availability of a power source at the IoT device, a time specified by the IoT device to perform power harvesting, or a combination thereof.

Aspect 20 is the method of any of aspects 16 to 19, where the wireless device is a UE, a network node, a network entity, a TRP or a base station.

Aspect 21 is an apparatus for wireless communication at an IoT device, including: a memory; and at least one processor coupled to the memory and, based at least in part on information stored in the memory, the at least one processor is configured to implement any of aspects 16 to 20.

Aspect 22 is the apparatus of aspect 21, further including at least one of a transceiver or an antenna coupled to the at least one processor.

Aspect 23 is an apparatus for wireless communication including means for implementing any of aspects 16 to 20.

Aspect 24 is a computer-readable medium (e.g., a non-transitory computer-readable medium) storing computer executable code, where the code when executed by a processor causes the processor to implement any of aspects 16 to 20.

What is claimed is:

1. An apparatus for wireless communication at a wireless device, comprising:
at least one memory; and
at least one processor coupled to the at least one memory and the at least one processor is configured to:
transmit an indication of a positioning session to an Internet of Things (IoT) device, wherein the indication initiates the positioning session for the IoT device;
transmit, based on the positioning session, a set of positioning reference signals (PRSs) to the IoT device via a plurality of transmission occasions;
receive, from the IoT device based on a reflection pattern, at least one PRS in the set of PRSs via at least one reception occasion; and
calculate a position of the IoT device or a distance between the wireless device and the IoT device based on a round-trip time (RTT) of the at least one PRS in the set of PRSs, wherein the RTT is calculated based on $t_{RTT}=2*t_{bias}+2*d/c$, d being the distance between the wireless device and the IoT device, $t_{RTT}$ being the RTT of the at least one PRS, $t_{bias}$ being a bias associated with transmitting and receiving one or more PRSs, and c being a speed of light.

2. The apparatus of claim 1, wherein the at least one processor is further configured to:
detect that the at least one PRS is reflected from the IoT device based on one or more of the reflection pattern or the at least one reception occasion.

3. The apparatus of claim 1, wherein the at least one processor is further configured to:
determine the bias ($t_{bias}$) associated with transmitting and receiving the at least one PRS via calibration with one or more objects with known distances.

4. The apparatus of claim 1, wherein the indication includes at least one of: the reflection pattern, a format for the set of PRSs, a duration for transmitting the set of PRSs, a number of repetitions for the set of PRSs, a number of the transmission occasions for the set of PRSs, or one or more modes associated with reflection operations of the set of PRSs.

5. The apparatus of claim 4, wherein to transmit the indication, the at least one processor is configured to transmit the indication to a plurality of IoT devices, and the at least one processor is further configured to:
receive an acknowledgement from at least the IoT device to participate the positioning session; and
select at least the IoT device among the plurality of IoT devices for the positioning session.

6. The apparatus of claim 1, wherein the reflection pattern is associated with a combination of reflection operations from the IoT device during a plurality of reception occasions, wherein the reflection operations include at least one of: a total reflection, an absorption, or an open-circuit.

7. The apparatus of claim 1, wherein to transmit the set of PRSs, the at least one processor is configured to transmit the set of PRSs via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

8. The apparatus of claim 1, further comprising at least one of a transceiver or an antenna coupled to the at least one processor, wherein to transmit the indication of the positioning session, the at least one processor is configured to transmit the indication of the positioning session via at least one of the transceiver or the antenna, wherein the wireless device is a user equipment (UE), a network node, a network entity, a transmission reception point (TRP), or a base station.

9. A method of wireless communication at a wireless device, comprising:
transmitting an indication of a positioning session to an Internet of Things (IoT) device, wherein the indication initiates the positioning session for the IoT device;
transmitting, based on the positioning session, a set of positioning reference signals (PRSs) to the IoT device via a plurality of transmission occasions;
receiving, from the IoT device based on a reflection pattern, at least one PRS in the set of PRSs via at least one reception occasion; and
calculating a position of the IoT device or a distance between the wireless device and the IoT device based on a round-trip time (RTT) of the at least one PRS in the set of PRSs, wherein the RTT is calculated based on $t_{RTT}=2*t_{bias}+2*d/c$, d being the distance between the wireless device and the IoT device, $t_{RTT}$ being the RTT of the at least one PRS, $t_{bias}$ being a bias associated with transmitting and receiving one or more PRSs, and c being a speed of light.

10. The method of claim 9, further comprising:
detecting that the at least one PRS is reflected from the IoT device based on one or more of the reflection pattern or the at least one reception occasion.

11. The method of claim 9, further comprising:
determining the bias ($t_{bias}$) associated with transmitting and receiving the at least one PRS via calibration with one or more objects with known distances.

12. The method of claim 9, wherein the indication includes at least one of: the reflection pattern, a format for the set of PRSs, a duration for transmitting the set of PRSs, a number of repetitions for the set of PRSs, a number of the transmission occasions for the set of PRSs, or one or more modes associated with reflection operations of the set of PRSs, and wherein the indication is transmitted to a plurality of IoT devices, the method further comprising:
receiving an acknowledgement from at least the IoT device to participate the positioning session; and
selecting at least the IoT device among the plurality of IoT devices for the positioning session.

13. The method of claim 9, wherein the reflection pattern is associated with a combination of reflection operations from the IoT device during a plurality of reception occasions, wherein the reflection operations include at least one of: a total reflection, an absorption, or an open-circuit.

14. The method of claim 9, wherein the set of PRSs is transmitted via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

15. An apparatus for wireless communication at a wireless device, comprising:
at least one memory; and
at least one processor coupled to the at least one memory and the at least one processor is configured to:
transmit an indication of a positioning session to a plurality of Internet of Things (IoT) devices, wherein the indication includes at least one of: a reflection pattern, a format for a set of positioning reference signals (PRSs), a duration for transmitting the set of PRSs, a number of repetitions for the set of PRSs, a number of transmission occasions for the set of PRSs, or one or more modes associated with reflection operations of the set of PRSs;
receive an acknowledgement from an IoT device in the plurality of Internet of Things (IoT) devices to participate the positioning session;
select at least the IoT device among the plurality of IoT devices for the positioning session;
transmit, based on the positioning session, the set of PRSs to the IoT device via the plurality of transmission occasions; and
receive, from the IoT device based on the reflection pattern, at least one PRS in the set of PRSs via at least one reception occasion.

16. The apparatus of claim 15, wherein the at least one processor is further configured to:
detect that the at least one PRS is reflected from the IoT device based on one or more of the reflection pattern or the at least one reception occasion.

17. The apparatus of claim 15, wherein the reflection pattern is associated with a combination of reflection operations from the IoT device during a plurality of reception occasions, wherein the reflection operations include at least one of: a total reflection, an absorption, or an open-circuit.

18. The apparatus of claim 15, wherein to transmit the set of PRSs, the at least one processor is configured to transmit the set of PRSs via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

19. The apparatus of claim 15, further comprising at least one of a transceiver or an antenna coupled to the at least one processor, wherein to transmit the indication of the positioning session, the at least one processor is configured to transmit the indication of the positioning session via at least one of the transceiver or the antenna, wherein the wireless device is a user equipment (UE), a network node, a network entity, a transmission reception point (TRP), or a base station.

20. A method for wireless communication at a wireless device, comprising:
transmitting an indication of a positioning session to a plurality of Internet of Things (IoT) devices, wherein the indication includes at least one of: a reflection pattern, a format for a set of positioning reference signals (PRSs), a duration for transmitting the set of PRSs, a number of repetitions for the set of PRSs, a number of transmission occasions for the set of PRSs, or one or more modes associated with reflection operations of the set of PRSs;
receiving an acknowledgement from an IoT device in the plurality of Internet of Things (IoT) devices to participate the positioning session;
selecting at least the IoT device among the plurality of IoT devices for the positioning session;
transmitting, based on the positioning session, the set of PRSs to the IoT device via the plurality of transmission occasions; and
receiving, from the IoT device based on the reflection pattern, at least one PRS in the set of PRSs via at least one reception occasion.

21. The method of claim 20, further comprising:
detecting that the at least one PRS is reflected from the IoT device based on one or more of the reflection pattern or the at least one reception occasion.

22. The method of claim 20, wherein the reflection pattern is associated with a combination of reflection operations from the IoT device during a plurality of reception occasions, wherein the reflection operations include at least one of: a total reflection, an absorption, or an open-circuit.

23. The method of claim 20, wherein transmitting the set of PRSs comprises transmitting the set of PRSs via the plurality of transmission occasions with a time gap between two consecutive transmission occasions, the time gap being based on a type of the IoT device, a storage associated with the IoT, availability of a power source at the IoT device, a time specified by the IoT device to perform power harvesting, or a combination thereof.

* * * * *